(12) United States Patent
Apecetche et al.

(10) Patent No.: US 7,381,780 B2
(45) Date of Patent: Jun. 3, 2008

(54) CATALYST COMPOSITIONS COMPRISING SMALL SILICA SUPPORT MATERIALS AND METHODS OF USE IN POLYMERIZATION REACTIONS

(75) Inventors: Maria A. Apecetche, Bridgewater, NJ (US); Phuong A. Cao, Old Bridge, NJ (US); Michael D. Awe, Langhorne, PA (US); Ann M. Schoeb-Wolters, Lebanon, NJ (US); Ryan W. Impelman, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 11/825,867

(22) Filed: Jul. 10, 2007

(65) Prior Publication Data

US 2007/0265402 A1 Nov. 15, 2007

Related U.S. Application Data

(60) Division of application No. 11/441,505, filed on May 26, 2006, now Pat. No. 7,259,125, which is a continuation-in-part of application No. 11/151,097, filed on Jun. 13, 2005, now abandoned.

(51) Int. Cl.
*C08F 4/42* (2006.01)

(52) U.S. Cl. ............... 526/129; 502/103; 502/133; 502/132; 502/87; 502/125; 502/232; 526/123.1; 526/123.2; 526/123.3; 526/348

(58) Field of Classification Search ............ 526/123.1, 526/123.2, 123.3, 129, 348; 502/103, 133, 502/132, 87, 125, 232
See application file for complete search history.

(56) References Cited

U.S. PATENT DOCUMENTS

| | | | | |
|---|---|---|---|---|
| 4,293,673 A | 10/1981 | Hamer et al. | ................. | 526/88 |
| 4,302,565 A | 11/1981 | Goeke et al. | ................. | 526/88 |
| 4,302,566 A | 11/1981 | Karol et al. | ................. | 526/125 |
| 4,349,648 A * | 9/1982 | Jorgensen et al. | ........ | 526/124.6 |
| 4,376,062 A | 3/1983 | Hamer et al. | ........... | 252/429 B |
| 4,379,759 A | 4/1983 | Goeke et al. | ........... | 252/429 B |
| 4,383,095 A | 5/1983 | Goeke et al. | ................. | 526/88 |
| 4,395,359 A | 7/1983 | Wagner et al. | .......... | 252/429 B |
| 4,405,495 A * | 9/1983 | Lee et al. | .................... | 502/104 |
| 4,427,573 A | 1/1984 | Miles et al. | ................ | 502/111 |
| 4,482,687 A | 11/1984 | Noshay et al. | .............. | 526/125 |
| 5,290,745 A | 3/1994 | Jorgensen et al. | .......... | 502/109 |
| 5,869,575 A | 2/1999 | Kolthammer et al. | ....... | 525/240 |
| 6,172,173 B1 | 1/2001 | Spencer et al. | .......... | 526/348.2 |
| 2003/0236365 A1 | 12/2003 | Tian et al. | .................... | 526/72 |

FOREIGN PATENT DOCUMENTS

| | | |
|---|---|---|
| EP | 0 043 220 B1 | 3/1986 |
| EP | 0 499 093 A2 | 8/1992 |
| WO | 04/000893 A1 | 12/2003 |
| WO | 2004/007572 A1 | 1/2004 |
| WO | 2006/082048 A1 | 8/2006 |

* cited by examiner

*Primary Examiner*—Ling-Sui Choi
(74) *Attorney, Agent, or Firm*—Kevin M. Faulkner; Leandro Arechederra

(57) ABSTRACT

Improved catalyst compositions, and polymerization processes using such improved catalyst compositions, are provided. An example of an improved catalyst composition is a supported catalyst system that includes at least one titanium compound, at least one magnesium compound, at least one electron donor compound, at least one activator compound, and at least one silica support material, the at least one silica support material having a median particle size in the range of from 20 to 50 microns with no more than 10% of the particles having a size less than 10 microns and no more than 10% of the particles having a size greater than 50 microns and average pore diameter of at least $\geq 220$ angstroms.

13 Claims, 6 Drawing Sheets

MALVERN Particle Size Distribution of Davison 955, Davison 955 Screened (325 Mesh Fraction) and Ineos ES757 Silicas

CATALYST COMPOSITIONS COMPRISING SMALL SILICA SUPPORT MATERIALS AND METHODS OF USE IN POLYMERIZATION REACTIONS

CROSS REFERENCE TO RELATED APPLICATIONS

This application is a divisional application of Ser. No. 11/441,505, filed May 26, 2006, now U.S. Pat. No. 7,259,125 which is a continuation-in-part of Ser. No. 11/151,097, filed Jun. 13, 2005, now abandoned, herein incorporated by reference in their entireties.

FIELD OF THE INVENTION

The present invention relates to a polymerization process using improved catalyst compositions. Specifically, the catalyst compositions of the present invention relate to a Ziegler-Natta type catalyst compound that includes a small silica support material, and demonstrate improved productivity.

BACKGROUND OF THE INVENTION

Advances in polymerization and catalysis have resulted in the ability to produce many new polymers having improved physical and chemical properties useful in a wide variety of superior products and applications. With the development of new catalysts, the choice of polymerization (solution, slurry, high pressure or gas phase) for producing a particular polymer have been greatly expanded. Also, advances in polymerization technology have provided more efficient, highly productive and economically enhanced processes.

As with any new technology field, particularly in the polyolefins industry, a small savings in cost often determines whether a commercial endeavor is even feasible. The industry has been extremely focused on developing new and improved catalyst systems. Some have focused on designing the catalyst systems to produce new polymers, others on improved operability, and many more on improving catalyst productivity. The productivity of a catalyst, that is, the amount of polymer produced per gram of the catalyst, usually is the key economic factor that can make or break a new commercial development in the polyolefin industry.

Ziegler-Natta catalyst systems are utilized extensively in commercial processes that produce high density and low-density polyethylenes in a variety of molecular weights. Production rates in certain gas phase reactors may be limited in their ability to discharge from the reactor the polymer particles that are produced during the reaction. In certain of such cases, an increase in the bulk density of the polymer particles may increase the production rate of the reactor. Generally, Ziegler-Natta catalysts that have increasing activity and productivity, and that are used in gas phase operations. may tend to produce polymer products that have decreasing bulk density. If a reactor is limited in its ability to discharge the polymer product, the use of a high activity catalyst may result in a decrease in the bulk density of the polymer product.

Background references include U.S. Pat. No. 4,405,495 and EP 0 043 220 A.

Considering the discussion above, a need exists for higher productivity catalyst systems capable of providing the efficiencies necessary for implementing commercial polyolefin processes. Thus, it would be highly advantageous to have a polymerization process and catalyst system capable of producing polyolefins with improved catalyst productivities and reactor performance.

BRIEF DESCRIPTION OF THE DRAWINGS

A more complete understanding of the present disclosure and advantages thereof may be acquired by referring to the following description taken in conjunction with the accompanying drawings, wherein.

Figure 1:
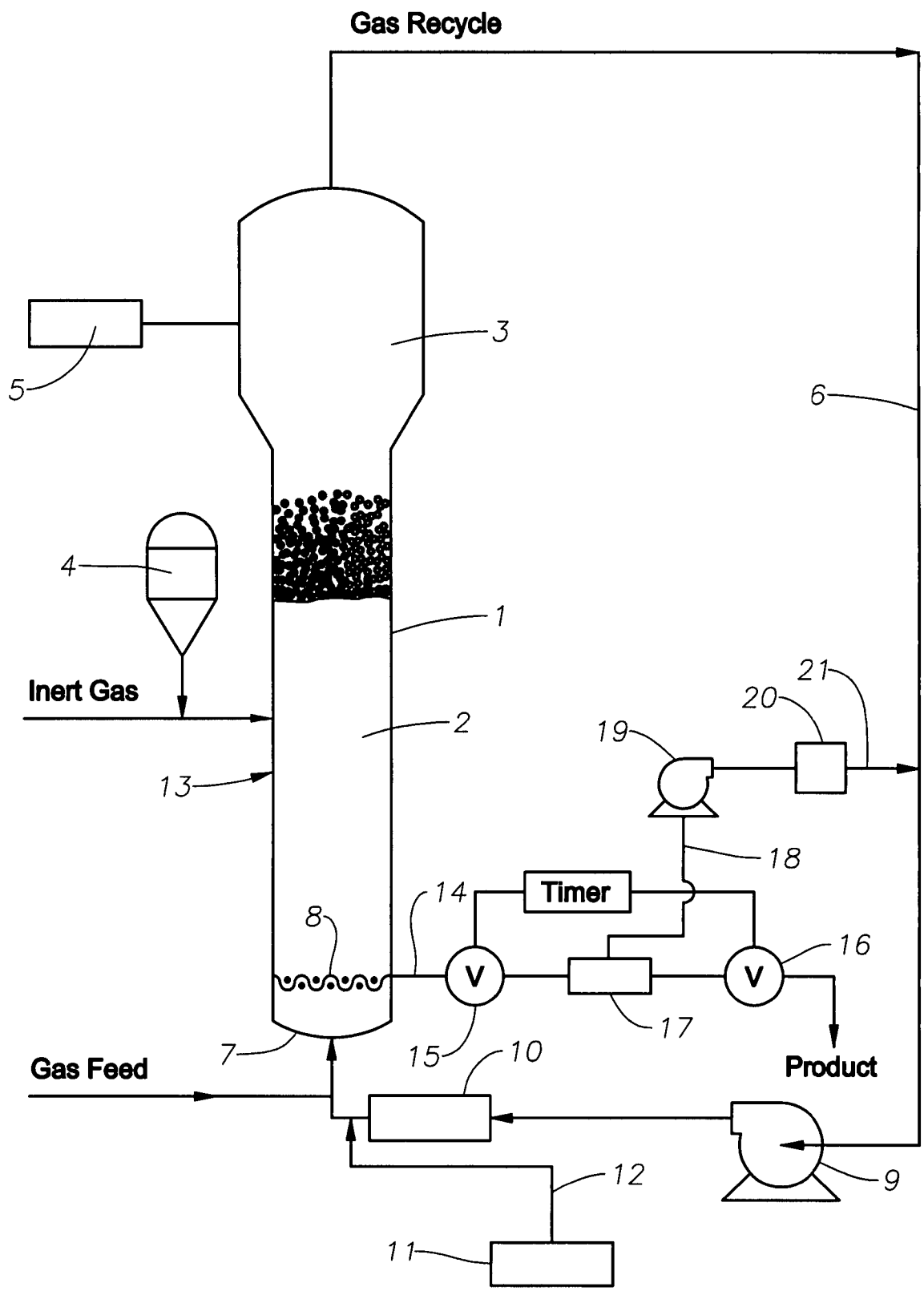
FIG. 1 is an exemplary process flow diagram for an exemplary reaction system with which an exemplary catalyst system of the present invention may be employed.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

It now has been found that polymers (e.g., ethylene homopolymers and copolymers) readily can be produced with desirable physical properties and catalyst system productivities in a low pressure gas phase fluid bed reaction process in the presence of a specific high productivity catalyst that is impregnated on a porous particulate silica having a particle size in a particular range, as is also detailed below.

High Activity Catalyst

The compounds used to form the catalysts of the present invention include at least one titanium compound, at least one magnesium compound, at least one electron donor compound, at least one activator compound and at least one silica material, exemplary embodiments of which are illustrated below.

Generally, the titanium compound has the formula

wherein
a. R is a $C_1$ to $C_{14}$ aliphatic or aromatic hydrocarbon radical, or COR' where R' is a $C_1$ to $C_{14}$ aliphatic or aromatic hydrocarbon radical;
b. X is selected from the group consisting of Cl, Br, I or a mixture thereof;
c. a is 0, 1 or 2;
d. b is 1 to 4 inclusive; and
e. a+b=3 or 4.

The titanium compounds individually may be present in the catalysts of the present invention, or the titanium compounds may be present in combinations thereof. A nonlimiting list of suitable titanium compounds includes $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

Generally, the magnesium compound has the formula $$MgX_2$$

wherein a. X is selected from the group consisting of Cl, Br, I or mixtures thereof.

Such magnesium compounds may be present individually in the catalysts of the present invention, or the magnesium compounds may be present in combinations thereof. A nonlimiting list of suitable magnesium compounds includes $MgCl_2$, $MgBr_2$ and $MgI_2$. In certain exemplary embodiments of the present invention, the magnesium compound may be anhydrous $MgCl_2$. Generally, the magnesium compound may be present in the catalysts of the present invention in an amount in the range of from 0.5 to 56 moles of magnesium compound per mole of titanium compound. In certain exemplary embodiments of the present invention, the magnesium compound may be present in the catalysts of the present invention in an amount in the range of from 1.5 to 11 moles of magnesium compound per mole of titanium compound. In certain exemplary embodiments of the present invention, the magnesium compound may be present in the catalysts of the present invention in an amount in the range of from 1.5 to 7 moles of magnesium compound per mole of titanium compound. Generally, the titanium compound and the magnesium compound may be used in a form that will facilitate their dissolution in the electron donor compound, as described herein below.

The electron donor compound generally may be any organic compound that is liquid at 25° C., and that may be capable of dissolving both the titanium compound and the magnesium compound. A nonlimiting list of suitable electron donor compounds includes such compounds as alkyl esters of aliphatic and aromatic carboxylic acids, aliphatic ethers, cyclic ethers and aliphatic ketones. In certain embodiments, suitable electron donor compounds may be alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and, in certain embodiments, $C_4$ cyclic mono- or di-ethers; $C_3$ to $C_6$, and, in certain embodiments, $C_3$ to $C_4$, aliphatic ketones. In certain exemplary embodiments, the electron donor compound may be methyl formate, ethyl acetate, butyl acetate, ethyl ether, hexyl ether, tetrahydrofuran, dioxane, acetone or methyl isobutyl ketone, among others.

The electron donor compounds may be present individually in the catalysts of the present invention, or they may be present in combinations thereof. Generally, the electron donor compound may be present in the range of from 2 to 85 moles of the electron donor compound per mole of the titanium compound. In certain embodiments, the electron donor compound may be present in the catalysts of the present invention in an amount in the range of from 3 to 10 moles of the electron donor compound per mole of the titanium compound.

The activator compound generally has the formula $$Al(R'')_c X'_d H_e$$

wherein

X' is Cl, or OR''';

R'' and R''' are the same or different, and are $C_1$ to $C_{14}$ saturated hydrocarbon radicals;

d is 0 to 1.5;

e is 1 or 0;

and c+d+e=3.

Such activator compounds may be present individually in the catalysts of the present invention, or they may be present in combinations thereof. A nonlimiting list of suitable activator compounds includes $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$ and $Al(C_2H_5)_2(OC_2H_5)$.

Generally, the activator compound may be present in the catalysts of the present invention in an amount in the range of from 10 to 400 moles of activator compound per mole of the titanium compound, and in certain embodiments may be present in the range of from 15 to 60 moles of the activator compound per mole of the titanium compound, and in certain embodiments may be present in the range of from 2 to 7 moles of the activator compound per mole of the titanium compound.

The silica support that may be employed in the catalysts of the present invention generally has a particle size distribution within the range of from 2 microns to 100 microns, and a median particle size in the range of from 20 microns to 50 microns. In certain exemplary embodiments, the silica support has a particle size distribution within the range of from 2 microns to 80 microns. In certain exemplary embodiments, the silica support has a median particle size in the range of from 20 microns to 35 microns, and in the range of from 20 to 30 microns in certain exemplary embodiments. In certain exemplary embodiments, the silica support has a particle size distribution in which no more than 10% of the particles have a size below 10 microns, and no more than 10% of the particles have a size greater than 50 microns. In certain exemplary embodiments, the silica support has a particle size distribution in which no more than 10% of the particles have a size below 12 microns, and no more than 8% of the particles have a size greater than 50 microns. As the size of the silica support decreases, the productivity of the supported catalyst generally increases, as does the FAR value of film formed from resin produced by the supported catalyst. In certain exemplary embodiments, this may be accompanied by an increase in the bulk density and a decrease in the average particle size of such resin. Accordingly, the silica supports used in the improved catalysts of the present invention may facilitate, inter alia, greater productivity from the improved catalysts as well as the production of polymers having greater bulk density. In certain exemplary embodiments, the improved catalysts of the present invention comprising these silica supports may have a productivity (as based on a mass balance) that is at least 3,000 pounds polymer per pound of catalyst per hour; and that is at least 4,500 pounds polymer per pound of catalyst per hour in certain exemplary embodiments, and that is at least 6,000 pounds polymer per pound of catalyst per hour in certain exemplary embodiments, and that is at least 7,000 pounds polymer per pound of catalyst per hour in certain exemplary embodiments; and that is at least 9,000 pounds polymer per pound of catalyst per hour in certain exemplary embodiments. Certain exemplary embodiments of the catalysts of the present invention may have even greater productivities. In certain exemplary embodiments, the polymers produced from the processes of the present invention that employ improved catalysts that include these silica supports may have a settled bulk density of at least 21.5 pound per cubic foot in certain exemplary embodiments; and at least 22.5 pound per cubic foot in certain exemplary embodiments, and at least 23.5 pound per cubic foot in certain exemplary embodiments; and at least 24.0 pound per cubic foot in certain exemplary embodiments. Certain exemplary embodiments of the polymers produced from the processes of the present invention that employ improved catalysts that include these silica supports may have even greater settled bulk densities.

It also may be desirable for such silica support to have a surface area of ≧200 square meters per gram, and in certain exemplary embodiments, ≧250 square meters per gram. In certain exemplary embodiments, the average pore volume of such silica support ranges from 1.4 ml/gram to 1.8 ml/gram.

The silica support generally should be dry, that is, free of absorbed water. Drying of the silica support generally is performed by heating it at a temperature of ≧600° C.

In any of the embodiments described herein, the silica or at least one silica support materials may have an average pore diameter ≧220 Angstroms; alternatively, an average pore diameter ≧225 Angstroms; alternatively, an average pore diameter ≧230 Angstroms; alternatively, an average pore diameter ≧235 Angstroms; alternatively, an average pore diameter ≧240 Angstroms; alternatively, an average pore diameter ≧245 Angstroms; alternatively, an average pore diameter ≧250 Angstroms; alternatively, an average pore diameter ≧255 Angstroms; alternatively, an average pore diameter ≧260 Angstroms; and, alternatively, an average pore diameter ≧265 Angstroms, as described along with the method of measurement in more detail below.

Catalyst System

Formation of Precursor

The improved catalysts of the present invention may be prepared by first preparing a precursor composition from the titanium compound, the magnesium compound, and the electron donor compound, as described below, then impregnating the silica support with the precursor composition, and then treating the impregnated precursor composition with an activator compound as described below.

Generally, the precursor composition may be formed by dissolving the titanium compound and the magnesium compound in the electron donor compound at a temperature in the range of from 20° C. up to the boiling point of the electron donor compound. The titanium compound can be added to the electron donor compound before, or after, the addition of the magnesium compound, or concurrent therewith. The dissolution of the titanium compound and the magnesium compound may be facilitated by stirring, and in some instances by refluxing, these two compounds in the electron donor compound. After the titanium compound and the magnesium compound are dissolved, the precursor composition may be isolated by crystallization or by precipitation with a $C_5$ to $C_8$ aliphatic or aromatic hydrocarbon such as hexane, isopentane or benzene. The crystallized or precipitated precursor composition may be isolated, generally in the form of fine, free-flowing particles having an average particle size in the range of from 10 to 100 microns.

When prepared according to the procedure above, the precursor composition has the formula:

$$Mg_m Ti_1(OR)_n X_p [ED]_q$$

wherein:

ED is the electron donor compound;

m is ≧0.5 to ≦56, and, in certain exemplary embodiments, ≧1.5 to ≦11;

n is 0, 1 or 2;

p is ≧2 to ≦116, and, in certain exemplary embodiments, ≧6 to ≦14;

q is ≧2 to ≦85, and, in certain exemplary embodiments, ≧3 to ≦10;

R is a $C_1$ to $C_{14}$ aliphatic or aromatic hydrocarbon radical, or COR' wherein R' is a $C_1$ to $C_{14}$ aliphatic or aromatic hydrocarbon radical;

X is selected from the group consisting of Cl, Br, I or mixtures thereof; and the subscript for the element titanium (Ti) is the arabic numeral one.

Catalyst Preparation: Impregnation of Precursor in Support

The precursor composition then may be impregnated, in a weight ratio of about 0.003 to 1, and, in certain exemplary embodiments, about 0.1 to 0.33, parts of the precursor composition into one part by weight of the carrier material.

Before being impregnated, the silica support is dehydrated at 600° C., and also is treated with an aluminum alkyl compound (e.g., "TEAL"). Dehydrated silica supports that have been treated with TEAL may be referred to herein as TEAL-on-silica, or "TOS." The impregnation of the dehydrated, activated silica support (e.g., the TOS) with the precursor composition may be accomplished by dissolving the precursor composition in the electron donor compound, and by then admixing the dehydrated, activated silica support with the precursor composition to impregnate the dehydrated, activated silica support. The electron donor compound then may be removed by drying at temperatures of ≦60° C.

The silica support also may be impregnated with the precursor composition by adding the silica support to a solution of the chemical raw materials used to form the precursor composition in the electron donor compound, without isolating the precursor composition from such solution. The excess electron donor compound then may be removed by drying, or by washing and drying at temperatures of ≦60° C.

Activation of Precursor Composition

Generally, the precursor composition will be fully or completely activated, e.g., it will be treated with sufficient activator compound to transform the Ti atoms in the precursor composition to an active state. Suitable activators include, but are not limited to, tri-n-hexyl aluminum, triethyl aluminum, diethyl aluminum chloride, trimethyl aluminum, dimethyl aluminum chloride, methyl aluminum dichloride triisobutyl aluminum, tri-n-butyl aluminum, diisobutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{12}O)AlCl_2$ and the corresponding bromine and iodine compounds).

The precursor composition first may be partially activated outside the polymerization reactor with enough activator compound so as to provide a partially activated precursor composition having an activator compound/Ti molar ratio of >0 to <10:1, and, in certain exemplary embodiments, from 4 to 8:1. This partial activation reaction may be carried out in a hydrocarbon solvent slurry followed by drying of the resulting mixture (to remove the solvent), at temperatures between 20 to 80° C., and, in certain exemplary embodiments, between 50 to 70° C. The solvent for the activator(s) should be non-polar and capable of dissolving the activator(s), but not the precursor composition. Among the solvents which can be employed to dissolve the activator(s) are hydrocarbon solvents, such as isopentane, hexane, heptane, toluene, xylene, naptha and aliphatic mineral oils such as but not limited to Kaydol™, Hydrobrite™ 550 and the like.

The resulting product is a free-flowing solid particulate material that readily may be fed to the polymerization reactor. The partially activated and impregnated precursor composition may be fed to the polymerization reactor where the activation may be completed with additional activator compound, which may be the same or a different compound.

In certain exemplary embodiments, the additional activator compound and the partially activated impregnated precursor composition optionally may be fed to the reactor through separate feed lines. In certain of such embodiments, the additional activator compound may be sprayed into the reactor in either undiluted form (e.g., "neat"), or in the form of a solution of the additional activator compound in a hydrocarbon solvent (e.g., isopentane, hexane, or mineral oil). Such solution may contain about 2 to 30 weight percent of the activator compound. In certain of such embodiments, the additional activator compound may be added to the reactor in such amounts as to provide, along with the amounts of activator compound and titanium compound fed with the partially activated and impregnated precursor composition, a total Al/Ti molar ratio in the reactor of $\geq 10$ to 400, and, in certain exemplary embodiments, from 15 to 60. The additional amounts of activator compound added to the reactor may react with, and complete the activation of, the titanium compound in the reactor.

In a continuous gas phase process, such as the fluid bed process disclosed below, discrete portions of the partially activated precursor composition impregnated on the silica support are continuously fed to the reactor, along with discrete portions of additional activator compound, during the continuing polymerization process, and may replace active catalyst sites that are expended during the course of the reaction.

In any of the embodiments described herein, the catalyst system may exhibit high catalyst activity. In certain embodiments, the catalyst activity may be $\geq 20,000$ (g polymer), e.g., polyethylene/[(mmol Ti)(h))]; alternatively, $\geq 20,500$ (g polymer), e.g., polyethylene/[(mmol Ti)(h))]; alternatively, $\geq 21,000$ (g polymer), e.g., polyethylene/[(mmol Ti)(h))]; $\geq 22,000$ (g polymer), e.g., polyethylene/[(mmol Ti)(h))]; alternatively, $\geq 22,500$ (g polymer), e.g., polyethylene/[(mmol Ti)(h))]; alternatively, $\geq 25,000$ (g polymer), e.g., polyethylene/[(mmol Ti)(h))]; alternatively, $\geq 27,500$ (g polymer), e.g., polyethylene/[(mmol Ti)(h))]; alternatively, $\geq 28,000$ (g polymer), e.g., polyethylene/[(mmol Ti)(h))]; alternatively, $\geq 28,500$ (g polymer), e.g., polyethylene/[(mmol Ti)(h))]; alternatively, $\geq 29,000$ (g polymer), e.g., polyethylene/[(mmol Ti)(h))]; alternatively, $\geq 29,500$ (g polymer), e.g., polyethylene/[(mmol Ti)(h))]; alternatively, $\geq 30,000$ (g polymer), e.g., polyethylene/[(mmol Ti)(h))]; alternatively, $\geq 32,500$ (g polymer), e.g., polyethylene/[(mmol Ti)(h))]; and, alternatively, $\geq 35,000$ (g polymer), e.g., polyethylene/[(mmol Ti)(h))].

In other embodiments, alternatively stated, the catalyst activity may be $\geq 6,500$ (g polymer), e.g., polyethylene/(g precursor); alternatively, $\geq 7,000$ (g polymer), e.g., polyethylene/(g precursor); alternatively, $\geq 7,250$ (g polymer), e.g., polyethylene/(g precursor); alternatively, $\geq 7,500$ (g polymer), e.g., polyethylene/(g precursor); alternatively, $\geq 8,000$ (g polymer), e.g., polyethylene/(g precursor); alternatively, $\geq 8,500$ (g polymer), e.g., polyethylene/(g precursor); and alternatively, $\geq 9,000$ (g polymer), e.g., polyethylene/(g precursor).

Polymerization

The polymerization may be conducted by contacting a stream of monomer(s), in a gas phase process (such as in the fluid bed process described below), and substantially in the absence of catalyst poisons (e.g., moisture, oxygen, CO, $CO_2$, and acetylene) with a catalytically effective amount of the completely activated precursor composition at a temperature and at a pressure sufficient to initiate the polymerization reaction.

In order to achieve the desired density ranges in certain exemplary copolymers produced by the present invention, it may be well to copolymerize enough of the $\geq C_3$ comonomers with ethylene to achieve a level of >0 to 10 mol percent of the $C_3$ to $C_8$ comonomer in the copolymer. The amount of comonomer that may be used to achieve this result will depend on the particular comonomer(s) employed.

Table 1 below provides a listing of the amounts, in moles, of various comonomers that may be copolymerized with ethylene in order to provide polymers having a desired density range (e.g., within the range of from 0.91 to 0.97) at any given melt index. Table 1 also indicates the relative molar concentration, of such comonomers to ethylene, which may be present in the recycled gas stream of monomers under reaction equilibrium conditions in the reactor.

TABLE 1

| Comonomer | Mole % in copolymer | Gas Stream Comonomer/Ethylene molar ratio |
|---|---|---|
| propylene | >0 to 10 | >0 to 0.9 |
| butene-1 | >0 to 7.0 | >0 to 0.7 |
| pentene-1 | >0 to 6.0 | >0 to 0.45 |
| hexene-1 | >0 to 5.0 | >0 to 0.4 |
| octene-1 | >0 to 4.5 | >0 to 0.35 |

Referring now to FIG. 1, illustrated therein is an exemplary fluidized bed reaction system that may be used in the practice of the processes of the present invention. With reference thereto, the reactor 1 generally includes a reaction zone 2 and a velocity-reduction zone 3.

The reaction zone 2 includes a bed of growing polymer particles, formed polymer particles and a minor amount of catalyst particles fluidized by the continuous flow of gaseous components in the form of make-up feed and recycle gas through the reaction zone 2. To maintain a viable fluidized bed, the mass gas flow rate through the bed generally will be above the minimum flow required for fluidization, and, in certain exemplary embodiments, may be in the range of from 1.5 to 10 times $G_{mf}$ and, in certain exemplary embodiments, in the range of from 3 to 6 times $G_{mf}$. $G_{mf}$ is used in the accepted form as the abbreviation for the minimum mass gas flow required to achieve fluidization, as may be set forth further in, for example, C. Y. Wen and Y. H. Yu, "Mechanics of Fluidization," Chemical Engineering Progress Symposium Series, Vol. 62, p. 100-111 (1966).

Generally, the bed will contain particles that may prevent the formation of localized "hot spots" and that may entrap and distribute the particulate catalyst throughout the reaction zone 2. On start up, the reactor 1 usually may be charged with a base of particulate polymer particles before gas flow is initiated. Such particles may be identical in nature to the polymer to be formed, or may be different therefrom. When different, the particulate polymer particles provided as a base may be withdrawn with the desired formed polymer particles as the first product. Eventually, a fluidized bed of the desired polymer particles supplants the start-up bed.

In certain exemplary embodiments, the partially activated precursor composition (impregnated on the $SiO_2$ support) used in the fluidized bed may be stored for service in a reservoir 4 under a blanket of a gas that is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed may be equal to, or slightly greater than, the mass of the bed divided by the cross-sectional area, and thus may depend on the geometry of the reactor 1.

Make-up gas may be fed to the bed at a rate equal to the rate at which particulate polymer product is withdrawn. The composition of the make-up gas may be determined by a gas analyzer 5 positioned above the bed. The gas analyzer 5 may determine the composition of the gas being recycled, and the composition of the make-up gas may be adjusted accordingly to maintain an essentially steady state gaseous composition within the reaction zone 2.

To facilitate complete fluidization, the recycle gas and, where desired, part of the make-up gas, may be returned over gas recycle line 6 to the reactor 1 at point 7 below the bed. A gas distribution plate 8 may be located at this point above the point of return to aid in fluidizing the bed.

The portion of the gas stream that does not react in the bed constitutes the recycle gas which is removed from the reaction zone 2, preferably by passing it into a velocity reduction zone 3 above the bed where entrained particles may be given an opportunity to drop back into the bed.

The recycle gas then may be compressed in a compressor 9 and then passed through a heat exchanger 10 wherein the heat of reaction may be removed from it before it is returned to the bed. The temperature of the bed is controlled at an essentially constant temperature under steady state conditions by constantly removing heat of reaction. No noticeable temperature gradient exists within the upper portion of the bed. A temperature gradient will exist in the bottom of the bed in a layer of about 6 to 12 inches, between the temperature of the inlet gas and the temperature of the remainder of the bed. The recycle gas is then returned to the reactor 1 at its base 7 and to the fluidized bed through distribution plate 8. The compressor 9 also can be placed downstream of the heat exchanger 10.

The distribution plate 8 may play an important role in the operation of the reactor 1. The fluidized bed contains growing and formed particulate polymer particles as well as catalyst particles. As the polymer particles are hot and possibly active, it may be well to prevent them from settling, for if a quiescent mass is allowed to exist, any active catalyst contained therein may continue to react and cause fusion. Diffusing recycle gas through the bed at a rate sufficient to maintain fluidization throughout the bed is, therefore, beneficial. The distribution plate 8 serves this purpose, and may be a screen, slotted plate, perforated plate, a plate of the bubble cap type and the like. The elements of the distribution plate 8 all may be stationary, or the distribution plate 8 may be of the mobile type disclosed in U.S. Pat. No. 3,298,792. Whatever its design, it generally will diffuse the recycle gas through the particles at the base of the bed to keep the bed in a fluidized condition, and also serve to support a quiescent bed of resin particles when the reactor 1 is not in operation. The mobile elements of the distribution plate 8 may be used to dislodge any polymer particles entrapped in or on the distribution plate 8.

Hydrogen may be used as a chain transfer agent in the polymerization reaction of the present invention. The ratio of hydrogen/ethylene monomer employed generally will vary between 0 to 2.0 moles of hydrogen per mole of the ethylene monomer in the gas stream.

Any gas inert to the catalyst and reactants can also be present in the gas stream. In certain exemplary embodiments, the activator compound may be added to the reaction system downstream from heat exchanger 10. Thus, the activator compound may be fed into the gas recycle system from dispenser 11 through line 12.

Compounds of the formula $Zn(R_a)(R_b)$, wherein $R_a$ and $R_b$ are the same or different $C_1$ to $C_{14}$ aliphatic or aromatic hydrocarbon radicals, may be used (in conjunction with hydrogen), with the catalysts of the present invention, as molecular weight control or chain transfer agents, e.g., to increase the melt index values of the copolymers that are produced. From 0 to 100, and, in certain embodiments, from 20 to 30 moles of the Zn compound (as Zn) would be used in the gas stream in the reactor 1 per mol of titanium compound (as Ti) in the reactor 1. The zinc compound would be introduced into the reactor 1, preferably in the form of a dilute solution (2 to 30 weight percent) in a hydrocarbon solvent or absorbed on a solid diluent material, such as silica, in amounts of 10 to 50 weight percent. These compositions tend to be pyrophoric. The zinc compound may be added alone, or with any additional portions of the activator compound that are to be added to the reactor 1, from a feeder (not shown) which could be positioned adjacent dispenser 11.

Generally, the fluid bed reactor 1 will be operated at a temperature below the sintering temperature of the polymer particles to ensure that sintering will not occur. For the production of the polymers in the process of the present invention, an operating temperature of 30 to 150° C. generally may be employed. In certain exemplary embodiments, temperatures of 70 to 95° C. may be used to prepare products having a density in the range of from 0.91 to 0.92, and temperatures in the range of from 80 to 100° C. may be used to prepare products having a density in the range of >0.92 to 0.94.

The fluid bed reactor 1 is operated at pressures of up to 1000 psi, and in certain exemplary embodiments may be operated at a pressure of from 150 to 400 psi, with operation at the higher pressures in such ranges favoring heat transfer, because, inter alia, an increase in pressure increases the unit volume heat capacity of the gas.

The partially activated and $SiO_2$ supported precursor composition is injected into the bed at a rate equal to its consumption at a point 13 that is above the distribution plate 8. In certain exemplary embodiments, the catalyst may be injected at a point in the bed where good mixing of polymer particles occurs. The injection of the catalyst at a point above the distribution plate 8 may be beneficial because, inter alia, the catalysts used in the practice of the invention are highly active, such that injection of the catalyst into the area below the distribution plate 8 may cause polymerization to begin there and eventually cause plugging of the distribution plate 8. Injection into the viable bed, instead, aids in distributing the catalyst throughout the bed and tends to preclude the formation of localized spots of high catalyst concentration which may result in the formation of "hot spots." Injection of the catalyst into the reactor 1 above the bed may result in excessive catalyst carryover into the recycle line where polymerization may begin and plugging of the line and heat exchanger 10 eventually may occur.

A gas that is inert to the catalyst, such as nitrogen or argon, may be used to carry the partially reduced precursor composition, and any additional activator compound or non-gaseous chain transfer agent that is used, into the bed.

The production rate of the bed is controlled by the rate of catalyst injection. The production rate may be increased by simply increasing the rate of catalyst injection, and may be decreased by reducing the rate of catalyst injection.

Because any change in the rate of catalyst injection will change the rate of generation of the heat of reaction, the temperature of the recycle gas entering the reactor 1 may be adjusted upwards and downwards to accommodate the change in rate of heat generation. This facilitates the maintenance of an essentially constant temperature in the bed. Complete instrumentation of both the fluidized bed and the recycle gas cooling system may be useful to facilitate, inter alia, the detection of any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Because the rate of heat generation is directly related to product formation, a measurement of the temperature rise of the gas across the reactor 1 (the difference between inlet gas temperature and exit gas temperature) may be determinative of the rate of particulate polymer formation at a constant gas velocity.

In certain exemplary embodiments, the particulate polymer product may be continuously withdrawn at a point 14 at or close to the distribution plate 8 and in suspension with a portion of the gas stream that may be vented as the particles settle to minimize further polymerization and sintering when the particles reach their ultimate collection zone. The suspending gas may also be used to drive the product of one reactor to another reactor.

The particulate polymer product conveniently may be withdrawn through the sequential operation of a pair of timed valves 15 and 16 defining a segregation zone 17. While valve 16 is closed, valve 15 may be opened to emit a plug of gas and product to the zone 17 between it and valve 15, which then may be closed. Valve 16 then may be opened to deliver the product to an external recovery zone. Valve 16 then may be closed to await the next product recovery operation. The vented gas containing unreacted monomers may be recovered from zone 17 through line 18 and recompressed in compressor 19 and returned directly, or through a purifier 20, over line 21 to gas recycle line 6 at a point upstream of the recycle compressor 9.

Finally, the fluidized bed reactor 1 is equipped with an adequate venting system to allow venting of the bed during start up and shut down. The reactor 1 does not require the use of stirring means and/or wall scraping means. The recycle gas line 6 and the elements therein (e.g., compressor 9, heat exchanger 10) generally should have smooth surfaces, and should be devoid of unnecessary obstructions so as not to impede the flow of recycle gas.

The highly active catalyst system of this invention may yield a fluid bed product having an average particle size of from 0.01 to 0.04 inches, and, in certain exemplary embodiments, from 0.02 to 0.03 inches, in diameter wherein the catalyst residue may be very low. The polymer particles are relatively easy to fluidize in a fluid bed.

The feed stream of gaseous monomer, with or without inert gaseous diluents, may be fed into the reactor at a space time yield of about 2 to 10 pounds/hour/cubic foot of bed volume.

The term virgin resin or polymer as used herein means polymer, in granular form, as it is recovered from the polymerization reactor.

The catalysts of the present invention also may be used in the gas phase reaction process and apparatus disclosed in U.S. Pat. No. 4,255,542, which corresponds to European Patent Application No. 79101169.5, which was filed Apr. 17, 1979 and which was published on Oct. 31, 1979 as Publication No. 4966. These references disclose the use of an entirely straight sided fluid bed reactor that employs heat exchange means within the reactor.

Polymer(s)

A variety of polymers may be produced as products of the methods of the present invention. The polymers that may be prepared with the catalysts of the present invention include, inter alia, copolymers that include a major mol percent (e.g., $\geq 90\%$) of ethylene, and a minor mol percent (e.g., $\leq 10\%$) of one or more $C_3$ to $C_8$ alpha olefins. Generally, the $C_3$ to $C_8$ alpha olefins will not contain any branching on any of their carbon atoms that may be closer than the fourth carbon atom from the double bond. Examples of suitable $C_3$ to $C_8$ alpha olefins include, but are not limited to, propylene, butene-1, pentene-1, hexene-1,4-methyl pentene-1, heptene-1 and octene-1. In certain exemplary embodiments of the present invention, the $C_3$ to $C_8$ alpha olefins may include propylene, butene-1, hexene-1,4-methyl pentene-1 and octene-1.

The polymers that may be prepared with the catalysts of the present invention generally have a molecular weight distribution (Mw/Mn) in the range of from 2.5 to 6.0. In certain exemplary embodiments of the present invention, the polymers may have a molecular weight distribution in the range of from 2.7 to 4.1. Another means of indicating the molecular weight distribution value (Mw/Mn) of a polymer involves a parameter referred to as the melt flow ratio (MFR). For the polymers of the present invention, an MFR range of $\geq 20$ to $\leq 40$ corresponds to a Mw/Mn value range of 2.5 to 6.0, and an MFR value range of $\geq 22$ to $\leq 32$ corresponds to an Mw/Mn value range of 2.7 to 4.1.

The polymers that may be prepared with the catalysts of the present invention generally have a density in the range of from $\geq 0.91$ to $\leq 0.97$. In certain exemplary embodiments, the polymers may have a density in the range of from $\geq 0.916$ to $\leq 0.935$. In certain exemplary embodiments, the density of certain exemplary copolymers that may be prepared with the catalysts of the present invention, at a given copolymer melt index level, may be regulated by, inter alia, the amount of the one or more $C_3$ to $C_8$ comonomers that may be copolymerized with the ethylene. In certain embodiments of the present invention in which $C_3$ to $C_8$ comonomers are not reacted with ethylene in the presence of a catalyst of the present invention, the ethylene generally will homopolymerize with the catalysts of the present invention, thereby providing homopolymers. In certain exemplary embodiments, the homopolymers produced in accordance with the present invention may have a density of $\geq 0.96$. Thus, the density of the polymers that may be prepared with the catalysts of the present invention progressively may be lowered through the addition of progressively larger amounts of one or more $C_3$ to $C_8$ comonomers. The amount of each of the various $C_3$ to $C_8$ comonomers that may be used to provide a copolymer having a desired density generally will vary from comonomer to comonomer, under the same reaction conditions. Thus, for an operator to provide a copolymer having the same given density at a given melt index level, the operator generally may add larger molar amounts of the different $C_3$ to $C_8$ comonomers, in the following order: $C_3 > C_4 > C_5 > C_6 > C_7 > C_8$.

The polymers that may be prepared with the catalysts of the present invention generally have a standard or normal load melt index in the range of from ≧0.01 to about 100. In certain exemplary embodiments, the polymers may have a standard or normal load melt index in the range of from 0.5 to 80. The polymers may have a high load melt index (HLMI) in the range of from 11 to 2000. The melt index of the polymers that may be prepared with the catalysts of the present invention may be a function of a variety of factors including, inter alia, the temperature of the polymerization reaction, the density of the copolymer, the ratio of hydrogen to ethylene monomer present during the reaction, and the ratio of $C_3$ to $C_8$ comonomer to ethylene monomer present during the reaction. Thus, an operator may increase the melt index of the polymers by, inter alia, increasing the polymerization temperature, and/or by decreasing the density of the copolymer, and/or by increasing the hydrogen/ethylene monomer ratio, and/or by increasing the ratio of $C_3$ to $C_8$ comonomer to ethylene monomer. In addition to hydrogen, an operator optionally may include other chain transfer agents (e.g., dialkyl zinc compounds) to further increase the melt index of the polymers.

The polymers of the present invention generally have an unsaturated group content of ≦1. In certain exemplary embodiments, the polymers of the present invention may have an unsaturated group content in the range of from ≧0.1 to ≦0.3 carbon-carbon double bond per 1000 carbon atoms.

The polymers of the present invention generally have a residual catalyst content, which may vary depending on the productivity of the catalyst system. For a catalyst system having a productivity level of ≧100,000 pounds of polymer per pound of residual metal in the polymer, the polymers of the present invention produced through a process using such catalyst system may have a residual catalyst content, expressed in terms of parts per million (ppm) of titanium metal, in the range of from >0 to ≦10 ppm. For catalyst systems having a productivity level of ≧200,000 pounds of polymer per pound of residual metal in the polymer, the residual catalyst content may be in the range of from >0 to ≦5 ppm. For catalyst systems having a productivity level of ≧500,000 pounds of polymer per pound of residual metal in the polymer, the residual catalyst content in the polymers produced therefrom may be in the range of from >0 to ≦2 ppm. The homopolymers and copolymers of the present invention are readily produced by the processes of the present invention at productivities of up to 500,000 pounds of polymer per pound of residual metal in the polymer.

The polymers of the present invention generally are granular materials that have an average particle size in the range of from 0.01 to 0.06 inches in diameter. In certain embodiments, the polymers have an average particle size in the range of from 0.02 to 0.03 inches, in diameter. The particle size may be an important factor for the purposes of readily fluidizing the polymer particles in a fluid bed reactor. The granular copolymers and homopolymers of the present invention have a bulk density in the range of from 19 pounds per cubic foot to 35 pounds per cubic foot. Expressed in different units, the granular copolymers and homopolymers of the present invention have a bulk density in the range of from 0.304 gram per cubic centimeter to 0.561 gram per cubic centimeter.

The polymers of the present invention may be useful in a variety of manners, including, but not limited to, the production of film therefrom, as well as in other molding applications. When the polymers of the present invention are to be used for film-making purposes, an operator may elect to use embodiments of the polymers of the present invention that have a density in the range of from ≧0.916 to ≦0.935, and in certain embodiments, a density in the range of from ≧0.917 to ≦0.928; a molecular weight distribution (Mw/Mn) in the range of from ≧2.7 to ≦4.1, and in certain embodiments, a molecular weight distribution (Mw/Mn) in the range of from ≧2.8 to ≦3.1; and a standard melt index in the range of from >0.5 to ≦5.0, and in certain embodiments, a standard melt index in the range of from ≧0.7 to ≦4.0. Generally, the films that may be produced from the polymers of the present invention may have a thickness in the range of from >0 to ≦10 mils, and in certain embodiments, a thickness in the range of from >0 to ≦5 mils, and in certain embodiments, a thickness in the range of from >0 to ≦1 mil.

When the polymers of the present invention are to be used in injection molding of flexible articles (e.g., houseware materials), an operator may elect to use embodiments of the polymers of the present invention that have a density in the range of from ≧0.920 to ≦0.940, and in certain exemplary embodiments, a density in the range of from ≧0.925 to ≦0.930; a molecular weight distribution Mw/Mn in the range of from ≧2.7 to ≦3.6, and in certain embodiments a molecular weight distribution Mw/Mn in the range of from ≧2.8 to ≦3.1; and a standard melt index in the range of from ≧2 to ≦100, and in certain embodiments a standard melt index in the range of from ≧8 to ≦80.

To facilitate a better understanding of the present invention, the following examples of some of the exemplary embodiments are given. In no way should such examples be read to limit, or to define, the scope of the invention.

EXAMPLE 1

For laboratory-prepared precursors, silicas first were dehydrated under nitrogen flow in a laboratory Carbolite Vertical Furnace, Model No. VST 12/32/400/2408 CP-FM supplied by Carbolite, Inc., provided with a quartz glass tube of 3.0 cm outer diameter and 70 cm in total length, and two thermocouples. One thermocouple was placed in a thermowell within the quartz glass tube, while the other was affixed to the skin of the quartz glass tube by placing it between the two folding halves of the furnace, then clamping the folding halves shut. The thermocouples were hooked up to a Nomad OM-SP1700 data logger supplied by Omega Engineering. A collection flask for excess blowout silica was attached at the top of the tube, which in turn was attached to a bubbler via a glass elbow.

Figure 2:
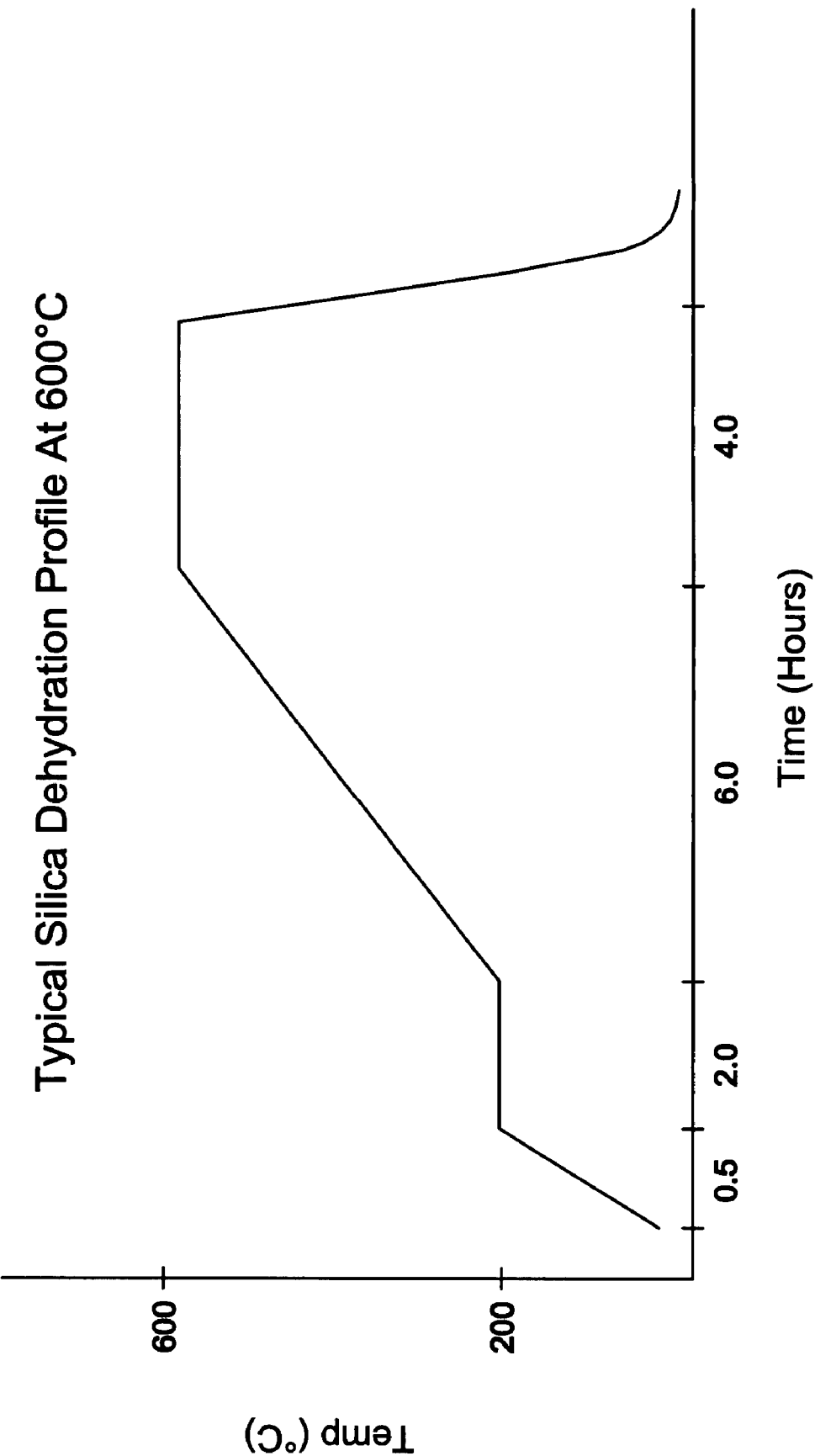
FIG. 2 is an exemplary silica dehydration profile used in certain exemplary embodiments of the present invention.

About 25-30 grams of silica was poured via a funnel into the quartz glass tube to fill the tube about ⅔ full within the heating zone. A preset program was started to begin the dehydration, using a Eurotherm 2408 Programmable Temperature Controller. A typical ramp and soak profile is shown in FIG. 2. The gas flow (in this case nitrogen) was preset to about 50-100 cubic centimeters per minute.

At the end of the dehydration cycle (typically overnight), the silica was discharged into a clean, dry, $N_2$-purged bottle and maintained in an inert atmosphere. The data logger information was downloaded to a computer file.

Three different silicas, (DAVISON-955™ silica (comparative), screened DAVISON-955™ silica (comparative), and INEOS ES757™ silica (inventive), were used to prepare laboratory-scale supported catalyst precursor compositions. Certain properties of these silicas are presented in the Tables 2 and 3 below. The screened Davison-955 silica consisted of the fraction of Davison 955 silica that passed through a 325 mesh (44 μm) screen.

TABLE 2

Summary of B.E.T. Surface Area and Pore Volume of Davison 600, Davison 955 Screened (through 325 Mesh) and Ineos ES757 Silicas

| Silica Type | 5-pt B.E.T. Surface Area m²/g | Cumulative Adsorption S.A. m²/g | Cumulative Desorption S.A m²/g | Single Point Total Pore Volume cc/g | Cumulative Adsorption Pore Volume cc/g |
|---|---|---|---|---|---|
| Davison 955 | 317.5453 | 330.0554 | 407.9166 | 1.646722 | 1.618345 |
| Davison 955 - Dehydrated at 600° C. | 306.1673 | 306.3902 | 376.0159 | 1.652932 | 1.619226 |
| Davison 955 - Screened (through 325 Mesh) | 330.6516 | 336.0729 | 398.6051 | 1.643374 | 1.607446 |
| Ineos ES757 | 280.1078 | 270.5909 | 339.8820 | 1.601038 | 1.568156 |
| Ineos ES757 - Dehydrated at 600° C. | 269.6506 | 264.4110 | 331.4600 | 1.567730 | 1.536919 |

TABLE 3

Summary of Pore Size by B.E.T. of Davison 600, Davison 955 Screened (through 325 Mesh) and Ineos ES757 Silicas

| Silica Type | Cumulative Desorption Pore Volume cc/g | Average Pore Diameter Angstroms (4 V/A by B.E.T.) | Adsorption Average Pore Diameter (4 V/A) | Desorption Average Pore Diameter (4 V/A) |
|---|---|---|---|---|
| Davison 955 | 1.635965 | 207.0535 | 196.1302 | 160.4215 |
| Davison 955 - Dehydrated at 600° C. | 1.637997 | 215.9515 | 211.394 | 174.2476 |
| Davison 955 - Screened (through 325 Mesh) | 1.625029 | 198.8043 | 191.3211 | 163.0715 |
| Ineos ES757 | 1.587304 | 228.6317 | 231.8121 | 186.8064 |
| Ineos ES757 - Dehydrated at 600° C. | 1.555146 | 232.5572 | 232.5045 | 187.6722 |

The nitrogen adsorption/desorption analysis was performed on a Micromeritics Accelerated Surface Area & Porosimetry instrument (ASAP 2405). The silica samples were out-gassed overnight at 200° C. while under vacuum prior to analysis to remove any physisorbed species (i.e., moisture) from the sample's surface. Approximately 0.5 gram of sample was used for the analysis.

Typically, B.E.T. surface areas, corresponding to the methodology developed by Brunauer, Emmett, and Teller, are achieved with a precision of <3% relative standard deviation (RSD). The instrument employs a static (volumetric) method of dosing samples and measures the quantity of gas (nitrogen) that can be physically adsorbed (physisorbed) on a solid at liquid nitrogen temperature. For the multi-point B.E.T. measurement, the volume of nitrogen uptake was measured at 5 pre-selected relative pressure points (0.06, 0.08, 0.12, 0.16, and 0.20) at constant temperature. The relative pressure is the ratio of the applied nitrogen pressure to the vapor pressure of nitrogen at the analysis temperature of 77 K. Pore sizes >~3,000 Å diameter (>0.30 μm) are not detected by this method but can be detected with mercury porosimetry.

Test conditions for the nitrogen adsorption/desorption isotherms include 15 second equilibration interval, 97-point pressure table (40 adsorption points, 40 desorption points, 5-point B.E.T. surface area, 15 micropore points, and 1-point total pore volume), 2.5%/2.5 mmHg P/Po tolerance, and 120 min Po interval.

The B.E.T. surface area, pore volume, and pore size results include surface area and porosimetry data for pore sizes up to ~3,000 angstroms diameter for the silica samples. The adsorption and desorption results includes pore sizes between ~17-3,000 Å diameter, ~0.0017-0.3 μm. A single point TPV was input at P/Po 0.995.

There was complete closure of desorption curve with the adsorption curve for the silica samples. However, differences in results in adsorption vs. desorption data can occur and is largely because desorption process behaves differently than the adsorption process. Typically, an adsorbate gas (nitrogen) will desorb much slower than when it condenses to fill a material's pores.

Generally, desorption branch of an isotherm is used to relate the amount of adsorbate lost in a desorption step to the average size of pores emptied in the step. A pore loses its condensed liquid adsorbate, known as the core of the pore, at a particular relative pressure related to the core radius by the Kelvin equation. After the core is evaporated, a layer of adsorbate remains on the wall of the pore. The thickness of this adsorbed layer is calculated for a particular relative pressure from the thickness equation. This layer becomes thinner with successive decreases in pressure, so that the measured quantity of gas desorbed in a step is composed of a quantity equivalent to the liquid cores evaporated in that step plus the quantity desorbed from the pore walls of pores whose cores have evaporated in that and previous steps. Barrett, Joyner, and Halenda [Barrett, E. P., Joyner, L. G., Halenda, P. P., J. Am. Chem. Soc. 1951 73 373-380.] developed the method (known as the BJH method) which incorporates these ideas.

A pore filled with condensed liquid nitrogen has 3 zones:

The core—evaporates all at once when the critical pressure for that radius is reached; the relationship between the core radius and the critical pressure is defined by the Kelvin equation. The adsorbed layer—composed of adsorbed gas that is stripped off a bit at a time with each pressure step; the relationship between the thickness of the layer and the relative pressure is defined by the thickness equation. The walls of the cylindrical pore itself—the diameter of the empty pore is required to determine the pore volume and area. End area is neglected.

The recommendation for using either adsorption or desorption data is to use the adsorption data instead of the desorption data for comparing results between samples. Typically, the adsorption process is very clean for BJH calculations. The desorption process of $N_2$ out of bottle-shaped pores can not usually distinguish what fraction of pores is open vs. closed (some open-ended vs. some closed-ended pores).

In general, the BET surface area, single point total pore volume (TPV), and average pore diameter (4V/A by BET) is best to use for comparing sample data since it also would include any micropore data <~17 Å diameter but not <~4-5 Å diameter. However, the adsorption data can also be used for comparing sample data but is limited to surface area and porosimetry analysis between ~17 and ~3,000 Å diameter.

The hydroxyl content of the three silicas dehydrated at 600° C. was characterized by titration with $TiCl_4$ in a hexane solution. After washing and drying of the treated silica, the titanium content of the treated silica (a measure of the presence of hydroxyl groups in the silica) was determined by a spectrophotometric method. The hydroxyl content of the three silicas is reported in the table below. The hydroxyl content was determined by $TiCl_4$ titration that binds to the surface OH-groups. The final titanium content, measured by a spectrophotometric method, is an indication of the OH-group content at a given dehydration temperature of the silica.

TABLE 4

| Silica Type | Hydroxyl Content at 600° C. as determined by $TiCl_4$ titration (mmol OH/g) |
|---|---|
| Davison 955 | 0.59 |
| Screened Davison-955 | 0.55 |
| Ineos ES757 | 0.59 |

Figure 3:
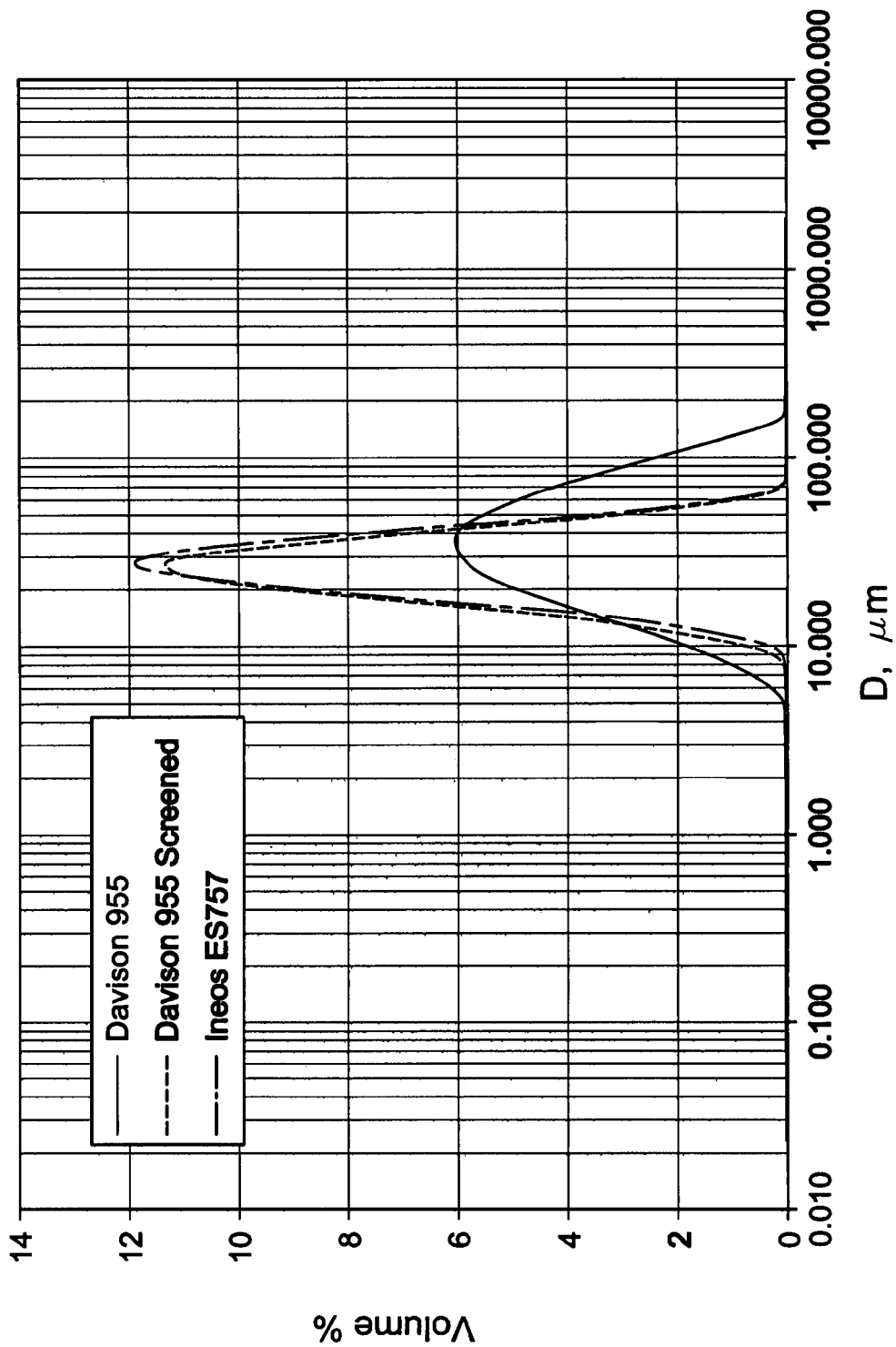
FIG. 3 illustrates particle size distributions for a sample of Davison 955 silica, a sample of Davison 955 silica that was screened through 325 mesh, and a sample of Ineos ES757 silica.

The silicas used as support material in the three laboratory-scale catalyst precursors have a particle size distribution, measured in a MALVERN Mastersizer 2000 analyzer, as shown below, and in FIG. 3.

TABLE 5

MALVERN Particle Size Distribution of Davison 600, Davison 955 Screened (through 325 Mesh) and Ineos ES757 Silicas

| Size µm | Davison 955 Volume % | Davison 955 Screened | Ineos ES757 Volume % |
|---|---|---|---|
| 0.02 | 0 | 0 | 0 |
| 0.025 | 0 | 0 | 0 |
| 0.028 | 0 | 0 | 0 |
| 0.032 | 0 | 0 | 0 |
| 0.036 | 0 | 0 | 0 |
| 0.04 | 0 | 0 | 0 |
| 0.045 | 0 | 0 | 0 |
| 0.05 | 0 | 0 | 0 |
| 0.056 | 0 | 0 | 0 |
| 0.063 | 0 | 0 | 0 |
| 0.071 | 0 | 0 | 0 |
| 0.08 | 0 | 0 | 0 |
| 0.089 | 0 | 0 | 0 |
| 0.1 | 0 | 0 | 0 |
| 0.112 | 0 | 0 | 0 |
| 0.126 | 0 | 0 | 0 |
| 0.142 | 0 | 0 | 0 |
| 0.159 | 0 | 0 | 0 |
| 0.178 | 0 | 0 | 0 |
| 0.2 | 0 | 0 | 0 |
| 0.224 | 0 | 0 | 0 |
| 0.283 | 0 | 0 | 0 |
| 0.317 | 0 | 0 | 0 |
| 0.356 | 0 | 0 | 0 |
| 0.399 | | | |
| 0.448 | 0 | 0 | 0 |
| 0.502 | 0 | 0 | 0 |
| 0.564 | 0 | 0 | 0 |
| 0.632 | 0 | 0 | 0 |
| 0.71 | 0 | 0 | 0 |
| 0.796 | 0 | 0 | 0 |
| 0.893 | 0 | 0 | 0 |
| 1.002 | 0 | 0 | 0 |

TABLE 5-continued

MALVERN Particle Size Distribution of Davison 600, Davison 955 Screened (through 325 Mesh) and Ineos ES757 Silicas

| Size μm | Davison 955 Volume % | Davison 955 Screened Volume % | Ineos ES757 Volume % |
|---|---|---|---|
| 1.125 | 0 | 0 | 0 |
| 1.262 | 0 | 0 | 0 |
| 1.416 | 0 | 0 | 0 |
| 1.589 | 0 | 0 | 0 |
| 1.783 | 0 | 0 | 0 |
| 2 | 0 | 0 | 0 |
| 2.24 | 0 | 0 | 0 |
| 2.518 | 0 | 0 | 0 |
| 2.825 | 0 | 0 | 0 |
| 3.17 | 0 | 0 | 0 |
| 3.557 | 0 | 0 | 0 |
| 3.991 | 0 | 0 | 0 |
| 4.477 | 0.02 | 0 | 0 |
| 5.024 | 0.07 | 0 | 0 |
| 5.637 | 0.26 | 0 | 0 |
| 6.325 | 0.48 | 0 | 0 |
| 7.096 | 0.76 | 0.02 | 0 |
| 7.962 | 1.12 | 0.09 | 0.03 |
| 8.934 | 1.53 | 0.39 | 0.14 |
| 10.024 | 2.01 | 0.93 | 0.53 |
| 11.247 | 2.53 | 1.81 | 1.25 |
| 12.619 | 3.08 | 3.06 | 2.35 |
| 14.159 | 3.65 | 4.66 | 3.9 |
| 15.887 | 4.2 | 6.47 | 5.79 |
| 17.825 | 4.71 | 8.34 | 7.86 |
| 20.000 | 5.15 | 9.92 | 9.76 |
| 22.440 | 5.53 | 11.01 | 11.23 |
| 25.179 | 5.58 | 11.36 | 11.92 |
| 28.251 | 5.98 | 10.87 | 11.67 |
| 31.698 | 6.06 | 9.36 | 10.51 |
| 35.566 | 6.04 | 7.86 | 8.66 |
| 39.905 | 5.92 | 5.83 | 6.45 |
| 44.774 | 5.7 | 3.92 | 4.3 |
| 50.238 | 5.39 | 2.35 | 2.45 |
| 56.368 | 4.99 | 1.16 | 1.04 |
| 63.246 | 4.5 | 0.31 | 0.16 |
| 70.963 | 3.94 | 0 | 0 |
| 79.621 | 3.31 | 0 | 0 |
| 89.337 | 2.66 | 0 | 0 |
| 100.237 | 2.02 | 0 | 0 |
| 112.468 | 1.41 | 0 | 0 |
| 126.191 | 0.9 | 0 | 0 |
| 141.589 | 0.27 | 0 | 0 |
| 158.866 | 0.01 | 0 | 0 |
| 178.250 | 0 | 0 | 0 |
| 200.000 | 0 | 0 | 0 |
| 224.404 | 0 | 0 | 0 |
| 251.785 | 0 | 0 | 0 |
| 282.508 | 0 | 0 | 0 |
| 316.979 | 0 | 0 | 0 |
| 355.656 | 0 | 0 | 0 |
| 399.052 | 0 | 0 | 0 |
| 447.744 | 0 | 0 | 0 |
| 502.377 | 0 | 0 | 0 |
| 563.677 | 0 | 0 | 0 |
| 632.456 | 0 | 0 | 0 |
| 709.627 | 0 | 0 | 0 |
| 796.214 | 0 | 0 | 0 |
| 893.367 | 0 | 0 | 0 |
| 1002.374 | 0 | 0 | 0 |
| 1124.683 | 0 | 0 | 0 |
| 1261.915 | 0 | 0 | 0 |
| 1415.892 | 0 | 0 | 0 |
| 1588.656 | 0 | 0 | 0 |
| 2000.000 | | | |

The particle size distribution was measured with accuracy ±1% on the D(0.5) in the size range 0.020-2000.000 microns. Measurements were made in n-heptane dispersion at room temperature using Hydro 2000S, small volume general-purpose automated sample dispersion unit.

Values of silicas particle size distribution are given in Table 6, where D(0.5) refers to the particle size in micron at which 50 w % of the sample is below that value, D(0.1) and D(0.9) respectively, 10 and 90 w % of the sample below. Span is a measure of particle size distribution=[D(0.9)−D(0.1)]/D(0.5).

TABLE 6

Particle Size Distribution of Davison 955,
Screened (through 325 Mesh), and Ineos ES757
Silicas Determined by MALVERN Analysis

| Silica Type | D (0.1) μm | D (0.5) μm | D (0.9) μm | Span |
|---|---|---|---|---|
| Davison 955 | 13.244 | 33.638 | 81.139 | 2.02 |
| Davison 955 - Screened (through 325 Mesh) | 15.562 | 26.033 | 42.617 | 1.04 |
| Ineos ES757 | 16.541 | 26.989 | 42.966 | 0.98 |

As shown in Tables 2, 3 and 5, Davison-955 silica has higher surface area and comparable pore volume than Ineos ES757 silica. However, Ineos ES757 silica has larger average pore diameter and smaller average particle size and narrower particle size distribution than Davison 955 silica.

About 9.5 grams of each of the three types of silica was placed in an oven-dried, air-free 100 mL Schlenk flask having a stir bar and rubber septum, to which about 50 ml of dry, degassed hexane and 3 mL of triethylaluminum (TEAL) heptane solution (1.54 M) were added. Each of the three mixtures was stirred for about 30 minutes in an oil bath at 40° C., after which point the oil bath temperature was raised to 70° C. and vacuum dried to complete dryness. The resulting mixtures may be referred to as laboratory TEAL-on-silica (laboratory TOS).

For each type silica, laboratory catalyst precursor compositions at mole ratios Mg/Ti=3 and Mg/Ti=5 were prepared according to the following procedure. In an oven dried, air-free 100 mL Schlenk flask provided with stir bar and rubber septum, about 0.35 grams of [$TiCl_3$, 0.33 $AlCl_3$], and 0.50 g of $MgCl_2$ were mixed in 18.5 mL of dry, degassed tetrahydrofuran (THF) supplied by Aldrich. The compound referred to as [$TiCl_3$, 0.33 $AlCl_3$] is a mixed compound that is obtained by reduction of $TiCl_3$ with metallic aluminum; the mixed compound thus contains 1 molecule of $AlCl_3$ per 3 molecules of $TiCl_3$. The operation was carried out in a "dry box." The flask was then placed in an oil bath over a stir/heating plate inside a hood. The septum was replaced by a condenser with a glass joint and provided with circulating cold water and a small $N_2$ flow through it. The oil bath was heated at 80° C., resulting in an internal temperature between 70 and 72° C. The system was maintained under stirring for about 2 hours until all solids dissolved in the refluxing THF. The solution was allowed to cool down, and was transferred to another oven-dried, air-free 100 ml Schlenk flask provided with stir bar and rubber septum containing 5.0 grams of laboratory TOS slurried in 20 mL of THF. (The transfer of solution was performed inside the dry box.) The flask was placed in the oil bath and the mixture was stirred for about 30 minutes at 80° C., then flushed with a $N_2$ vent for about 4-5 hours until most of the THF evaporated. The resulting catalyst precursors further were dried for 4 hours under vacuum (mechanical pump, $10^{-5}$ mmHg) in a water bath at 45° C. The elemental composition of the laboratory prepared precursors was determined by Induced Coupled Plasma (ICP) analysis and is reported in the table below.

TABLE 7

| Precursor | Ti (mmole/gram) | Mg (mmole/gram) | Al (mmole/gram) | THF (weight %) | Mg/Ti |
|---|---|---|---|---|---|
| Precursor 1 | 0.268 | 0.841 | 0.466 | 13.4 | 3.1 |
| Precursor 2 | 0.247 | 0.751 | 0.45 | 14.1 | 3.0 |
| Precursor 3 | 0.303 | 0.814 | 0.498 | 13.0 | 2.7 |

Precursor 1 comprised Davison 955 silica, had a magnesium/titanium ratio of 3, and is taken as a control.
Precursor 2 comprised Ineos ES-757 silica, and had a magnesium/titanium ratio of 3.
Precursor 3 comprised screened Davison 955 silica, and had a magnesium/titanium ratio of 3.

When precursors having mole ratios Mg/Ti=5 were prepared, the $MgCl_2$ loading was increased to meet this ratio (e.g., the ratio of Mg/Ti=5). To facilitate the solubility of $MgCl_2$ in THF, an amount of ethanol (ranging within EtOH/Mg mole ratios of from about 0.5 to about 2) was added to the THF solvent.

The light pink free-flowing powder precursors were then ready to be tested in polyethylene polymerization reactions.

A one liter stirred stainless steel jacketed reactor-autoclave equipped with a stirrer and a thermocouple was used for the polymerization reactions with Precursors 1-3. The reactor was thoroughly dried under a nitrogen purge at elevated temperatures (>100° C.) before each run. About 40 mL of dry, degassed 1-hexene (a co-monomer) was added via syringe to the empty reactor that was cooled at 60° C. after purging, or, in certain experiments, 40 mL of condensed 1-butene was loaded to reactor by an automated injection pump. About 500 mL of dry degassed isobutane was converted into liquid in a pressure tower and fed to the reactor. At this point tri-ethyl aluminum alkyl (TEAL) was injected to reactor with a syringe as a dilute (1.54 M) heptane solution. The TEAL acts as cocatalyst and also scavenges impurities (e.g., oxygen or moisture) that could deactivate the catalyst. Unless otherwise noted, 0.4 mmole TEAL was used in each experiment. The liquids were stirred at 650 rpm while the reactor was heated until the working temperature of 85° C. was reached. Next, a computer-controlled flow meter introduced about 1000 or 1500 mL of hydrogen, after which (and by the same mechanism) ethylene was fed until the reactor reached a total pressure of 125 psi. The polymerization reaction then was initiated by introducing 0.04 grams of laboratory catalyst precursor by means of a pressure injection device, which further will be described. The final pressure of the reactor was 380 psi. Ethylene was allowed to flow to maintain its partial pressure of 125 psi. The reactor operative variables (e.g., temperature, pressure and ethylene flow) were recorded along the reaction time, and stored in a computer through a data acquisition system. After a reaction period of 30 minutes, the ethylene flow was stopped, and the reactor was depressurized to ambient pressure while the temperature of the reactor was reduced to about 45° C., at which point the reactor was opened. The mass of polymer produced by the reaction was determined after allowing all of the remaining comonomer to evaporate, until the polymer weight stabilized for a desired period of time, which generally was in the range of from 1 to 4 hours.

The catalyst injection system used to conduct these experiments consists of a 5 mL stainless steel cylinder provided with valves and connectors in its extremes, coupled to a 50 mL cylinder that is attached via a flexible metal tubing to a 500 mL stainless steel bomb. The stainless steel bomb is capable of holding up to 400 psi of $N_2$. The catalyst precursor first was weighed and placed inside the 5 mL cylinder. About 5 mL of isopentane was placed in the 50 mL cylinder. The cylinders then were coupled through the connectors, but valves (resembling globe valves) isolated the content of each from the other. All these operations were carried out inside a dry box. After loading the catalyst, the device was removed from the dry box and connected to a reactor port through the small cylinder. In a nearly vertical position, the 5 mL-50 mL cylinders tandem was connected through the extreme of the large cylinder to the bomb pressurized with $N_2$ at 400 psi by a flexible metal tubing. The bomb was isolated from the cylinders by another valve, such that the bomb could be pressurized either before or after being connected to the cylinders. Through a fast, and coordinated, opening/closing of valves, the nitrogen confined in the bomb pushed the isopentane contained in the large cylinder through the small cylinder, thus impelling the catalyst to the reactor. It was proved that the catalyst was quantitatively transferred into the pressurized reactor.

The results of the polymerization tests using laboratory catalyst precursors are set forth in the table below.

occupied by a given mass of gas at standard temperature and pressure (e.g., 0 degrees C. and 1 atmosphere of pressure). The representation of the ethylene flow during the reaction time may be referred to as the "kinetic profile."

The greater ethylene uptake corresponding to laboratory prepared precursors employing ES757 silica (as compared to precursors employing different silica support materials) is consistent with the comparatively greater yield of polymer product that was shown in Table 8.

A statistical analysis of the laboratory polymerization results (performed using software supplied by JMP Software) established the standard deviation and confidence interval by analyzing the variance (anova). The analysis of the variance checks whether differences among the means exist.

The statistical results are presented in Table 9 The comparison between means and the corresponding 95% confidence interval indicates that silica Ineos ES 757 produced a catalysts precursor with activity that is significantly higher than activity of catalysts precursors made with Davison 955 and Davison 955 screened (through 325 Mesh).

TABLE 8

| Run No. | Precursor | Precursor Loaded to Reactor (grains) | Titanium Loaded to Reactor (mmol) | Yield (grams) | Activity (grams PE)/ [(mmol Ti)(h)] | Productivity (grams PE)/ (grams Precursor) |
|---|---|---|---|---|---|---|
| (comparative) | | | | | | |
| 1 | Precursor 1 | 0.0768 | 0.02058 | 178 | 17,296 | 4,635 |
| 2 | Precursor 1 | 0.0402 | 0.01077 | 99 | 18,378 | 4,925 |
| 3 | Precursor 1 | 0.0411 | 0.01101 | 99 | 17,976 | 4,818 |
| 4 | Precursor 1 | 0.0403 | 0.01080 | 101 | 18,703 | 5,012 |
| | | | | | Average: 18,088 | Average: 4,847 |
| (inventive) | | | | | | |
| 5 | Precursor 2 | 0.0409 | 0.0101 | 152 | 30,092 | 7,433 |
| 6 | Precursor 2 | 0.0404 | 0.0100 | 123 | 24,652 | 6,089 |
| 7 | Precursor 2 | 0.0409 | 0.0101 | 191 | 37,813 | 9,340 |
| 8 | Precursor 2 | 0.0412 | 0.0102 | 135 | 26,532 | 6,553 |
| 9 | Precursor 2 | 0.0408 | 0.0101 | 136 | 26,691 | 6,667 |
| | | | | | Average: 29,098 | Average: 7,186 |
| (comparative) | | | | | | |
| 10 | Precursor 3 | 0.0408 | 0.01024 | 134 | 21,679 | 6,569 |
| 11 | Precursor 3 | 0.0404 | 0.0122 | 122 | 19,933 | 6,040 |
| 12 | Precursor 3 | 0.0416 | 0.0126 | 131 | 20,786 | 6,298 |
| | | | | | Average: 21,024 | Average: 6,370 |

Figure 4:
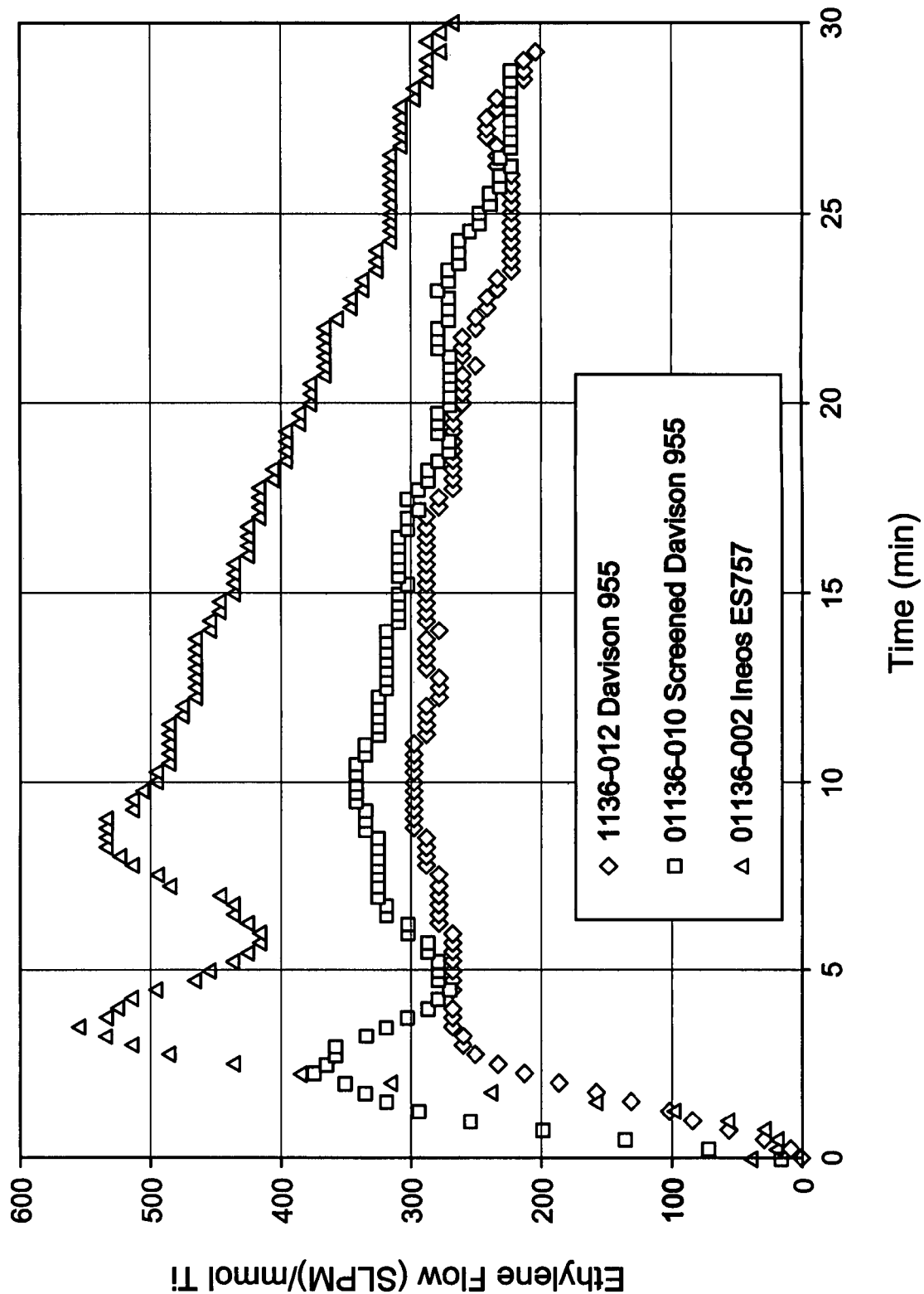
FIG. 4 is a graphical illustration of ethylene flow versus reaction time for certain exemplary polymerization processes employing exemplary catalyst systems that used a variety of exemplary support materials.

The laboratory-prepared catalyst precursors having a magnesium-to-titanium mole ratio of 3, with small particle size ES757 silica ("Precursor 2") demonstrated superior performance to that displayed by other laboratory-prepared catalyst precursors having similar compositions but different silica supports. These findings are additionally supported, and may be better visualized, by FIG. 4, which depicts a plot of ethylene flow versus reaction time that was obtained during laboratory isobutane slurry polymerizations. FIG. 4 displays the ethylene flow (as recorded by a computer-controlled Hastings mass flow meter Model HFC 202) versus reaction time. The ethylene flow is expressed as standard liters per minute (SLPM), which is the volume

TABLE 9

| Level | Number | Mean | Std. Dev. | Std. Err. Mean | Lower 95% | Upper 95% |
|---|---|---|---|---|---|---|
| Davison 955 | 4 | 18,088.3 | 606.12 | 303.1 | 17,124 | 19,053 |
| Screened Davison 955 | 3 | 21,024.3 | 826.22 | 477.0 | 18,972 | 23,077 |
| Ineos ES-757 | 5 | 29,098.4 | 5,259.61 | 2,352.2 | 22,568 | 35,629 |

Thus, Example 1 demonstrates, inter alia, that laboratory catalyst precursors prepared with silica support materials that have a smaller particle size, a narrower particle size distribution and average pore diameter of at least ≧220 angstroms may demonstrate desirable productivity and may be useful in polymerization processes to generate polymer products having desirable physical properties.

EXAMPLE 2

Scaled-up catalyst compositions were prepared in a pilot plant laboratory using a jacketed vessel (that may be referred to as a mix tank) according to the procedure set forth below. The capacity of the mix tank is on the order of about 2 pounds of catalyst material.

Silica dehydrated at 600° C. has a hydroxyl nominal concentration of 0.7 mmole OH/gram. The TEAL-on-Silica ("TOS") prepared for these scaled-up batches has a target aluminum loading of 0.5 mmole/gram. As TEAL reacts with hydroxyl according to a 1-to-1 molar ratio, then about 0.2 mmole OH/gram will remain unreacted on the TOS.

First, about 850 grams of silica were charged to the mix tank, for ES757 silica and Davison 955-600 silica. About 3.5 liters of isopentane then were added, after which about 0.59 grams of 10% TEAL in isopentane (0.93 ml) were added for every gram of silica charged. The TEAL reacts exothermically with the silica to form ethane. Accordingly, the TEAL charge was metered so as to keep the reactor temperature under a target setting of 35° C. The foregoing mixture was mixed for 30 minutes at a pressure of 10 psig. Drying was initiated by heating the jacket to 60° C. and reducing the internal reactor pressure to 5 psig. A nitrogen sweep was initiated. When the internal reactor temperature had stabilized between 55° C. and 60° C. for 2 hours, the mix tank contents were discharged. As noted above, the target aluminum loading for the scaled-up TEAL-on-Silica (scaled-up TOS) was 0.5 mmole/gram silica.

Scaled-up catalyst precursors were prepared according to the following procedure. About 3,500 grams of tetrahydrofuran (THF) was charged to the mix tank. The water content of the THF was less than 40 ppm of water. Magnesium chloride ($MgCl_2$) was added to the dry THF. The mix tank was pressurized to 5 psig and heated until the contents reached a temperature of 60° C. Stirring at 150 rpm was initiated. About 38.6 grams of ethanol were added, which dissolves the $MgCl_2$ almost instantly. Mixing continued for about 30 minutes, after which about 66.8 grams of $TiCl_3$, 0.33 $AlCl_3$ were charged. The mixture was mixed for an hour. The mix tank then was cooled so that the temperature of the contents fell below 50° C. About 800 grams of scaled-up TOS was charged and mixed for about 30 minutes.

The contents of the mix tank then were dried by heating the jacket of the mix tank to about 85° C., and reducing the internal pressure within the jacket by an incremental inch of pressure at a time until the pressure reached −5 inches of mercury. The internal pressure then was reduced to full vacuum, and a nitrogen sweep was initiated. When the temperature of the contents stabilized between 80 and 83° C. for three hours, the mix tank was pressurized to 5 psig, and cooled to below 40° C., at which point the scaled-up catalyst was discharged.

The catalyst precursors prepared as described above then were converted into catalyst compositions by treatment with at least one, and no more than two, activators. The relative amounts of the activator(s) were varied with respect to Ti content, to provide an Al:Ti molar ratio of about 1 to 5 of each one of the activators. First, about 800 grams of catalyst precursor was charged to a clean and inert mix tank. About 1,600 grams of solvent was slurried into the mix tank. The mixture was stirred at about 150 rpm, and the mix tank was pressurized to 5 psig. The mixture was mixed for 30 minutes, before drying was initiated through heating the jacket of the mix tank to 60° C. A nitrogen sweep also was begun, once the material became free-flowing. The material was dried until the reactor temperature stabilized at about 57° C. for one hour. The mix tank then was cooled to below about 40° C., and the catalyst composition contained therein was discharged therefrom.

Different catalyst formulations were prepared by varying the relative amounts of the selected activators, one of them containing an halogen atom, in such a way that their respective Al/Ti molar ratios were within the range of from 1 to 5. A total of 9 different catalyst formulations were prepared, comprising precursors prepared with both Davison 955 and ES757 silicas. The catalyst formulations comprising precursors prepared with Davison 955 silicas were labeled as A, C, D and E. The catalyst formulations comprising precursors prepared with Ineos ES757 silicas were labeled as A1, C1, D1, and E1. As each catalyst series progresses from A to E there is a consistent increase of the Al/Ti mole ratio for the halogen-containing activator, which is accompanied by an increase, although to a lower magnitude, of the non-halogen containing activator. The sample catalyst compositions prepared as described above then were used in polymerization reactions.

A one liter stirred stainless steel jacketed reactor-autoclave equipped with a stirrer and a thermocouple was used for the polymerization reactions. The reactor was thoroughly dried under a purge of nitrogen at 100° C. for 1 hour and cooled down to 45° C. before each run. About 0.8 mL of heptane dilute solution (1.54 M) of TEAL then was added to the reactor to act as cocatalyst and passivate any impurities. After stirring for 15 minutes, 0.15 gram catalyst was charged. The reactor then was sealed, and 1500 or 3000 cubic centimeters of hydrogen was charged as indicated in the tables that follow, after which the reactor was heated to 65° C. At this point, ethylene flow was initiated, and continued until the reactor reached polymerization conditions of 200 psi at 85° C.

Ethylene was allowed to flow to maintain the reactor pressure at 200 psi during the 30 minute reaction period. Ethylene uptake is measured through a computer-controlled flow meter. The temperature of the reactor was reduced to 45° C. while the reactor was depressured to ambient pressure, after which the reactor was opened. After allowing the solvent to evaporate, the mass of polymer produced from the reaction was determined. The polymer produced from the reaction then was characterized to determine a number of parameters, including Melt Flow Index (MI), High Load Melt Flow (HLM), and bulk density (BD).

Tables 10 and 11 below set forth certain parameters determined from laboratory ethylene homo-polymerizations conducted as set forth above with experimental scaled-up improved precursors.

Table 12 sets forth certain parameters determined from laboratory ethylene homo-polymerizations conducted as set forth above with scaled-up catalyst formulations at activation Al/Ti ratios located in the low end and in the medium end of the 1 to 5 range are compared to parameters of conventional Control Catalysts 1 and 4 (medium Al/Ti ratio range, e.g., containing an Al/Ti ratio that is about 2.5) and Control Catalysts 2 and 3 (at the lower end of the Al/Ti ratio range, e.g., containing an Al/Ti ratio that is close to 1) at comparable Al/Ti ratios.

TABLE 10

| Sample | Catalyst | H2 Loaded to Reactor (mL) | Catalyst Loaded to Reactor (grams) | Titanium Loaded to Reactor (mmol) | Yield (grams) | Activity (grams PE)/ [(mmol Ti)(h)] |
|---|---|---|---|---|---|---|
| 13 | Scaled-Up Davison 955 Silica Precursor | 1,500 | 0.0490 | 0.0127 | 82 | 12,913 |
| 14 | Scaled-Up Ineos ES-757 Silica Precursor | 1,500 | 0.0408 | 0.0102 | 111 | 21,764 |

TABLE 11

| Sample | Catalyst | Productivity (grams PE)/ [(grams cat)(hr)] | Melt Index (MI) (dg/minute) | Flow Melt Index (HLMI) (dg/minute) | MFR (HLMI/MI) | Settled Bulk Density (grams/cm3) |
|---|---|---|---|---|---|---|
| 13 | Scaled-Up Davison 955 Silica Precursor | 3,347 | Not Determined | Not Determined | Not Determined | 0.330 |
| 14 | Scaled-Up Ineos ES-757 Silica Precursor | 5,441 | 0.21 | 5.50 | 26.2 | 0.352 |

TABLE 12

| Sample | Catalyst | H2 Loaded to Reactor (mL) | Productivity (grams PE)/ [(grams cat)(hr)] | Melt Index (MI) (dg/minute) | Flow Melt Index (HLMI) (dg/minute) | MFR (HLMI/MI) | Settled Bulk Density (grams/cm³) |
|---|---|---|---|---|---|---|---|
| 15 | Control Catalyst 1 [Davison 955 silica, Mg/Ti = 3] | 3,000 | 1,369 | 1.59 | 47.60 | 29.9 | 0.366 |
| 16 | Control Catalyst 4 [Davison 955 silica, Mg/Ti = 3] | 3,000 | 760 | 1.00 | 29.60 | 29.8 | 0.390 |
| 17 | ScaleUp Catalyst C1 [Davison 955 silica, Mg/Ti = 5, with ethanol] | 3,000 | 1,846 | 2.38 | 75.20 | 31.6 | 0.342 |
| 18 | ScaleUp Catalyst E1 [Ineos ES-757 silica, Mg/Ti = 5, with ethanol] | 3,000 | 1,976 | 1.32 | 40.20 | 30.0 | 0.415 |
| 19 | Control Catalyst 2 [Davison 955 silica, Mg/Ti = 3] | 3,000 | 4,547 | 1.40 | 41.20 | 29.4 | 0.272 |
| 20 | Control Catalyst 3 [Davison 955 silica, Mg/Ti = 3] | 3,000 | 2,655 | 1.50 | 45.90 | 30.5 | 0.323 |
| 21 | ScaleUp Catalyst A [Davison 955 silica, Mg/Ti = 3] | 3,000 | 3,698 | 1.20 | 35.80 | 29.8 | 0.285 |
| 22 | ScaleUp Catalyst A [Ineos ES-757 silica, Mg/Ti = 5, with ethanol] | 3,000 | 5,141 | 1.40 | 42.50 | 30.4 | 0.336 |

Figure 5:
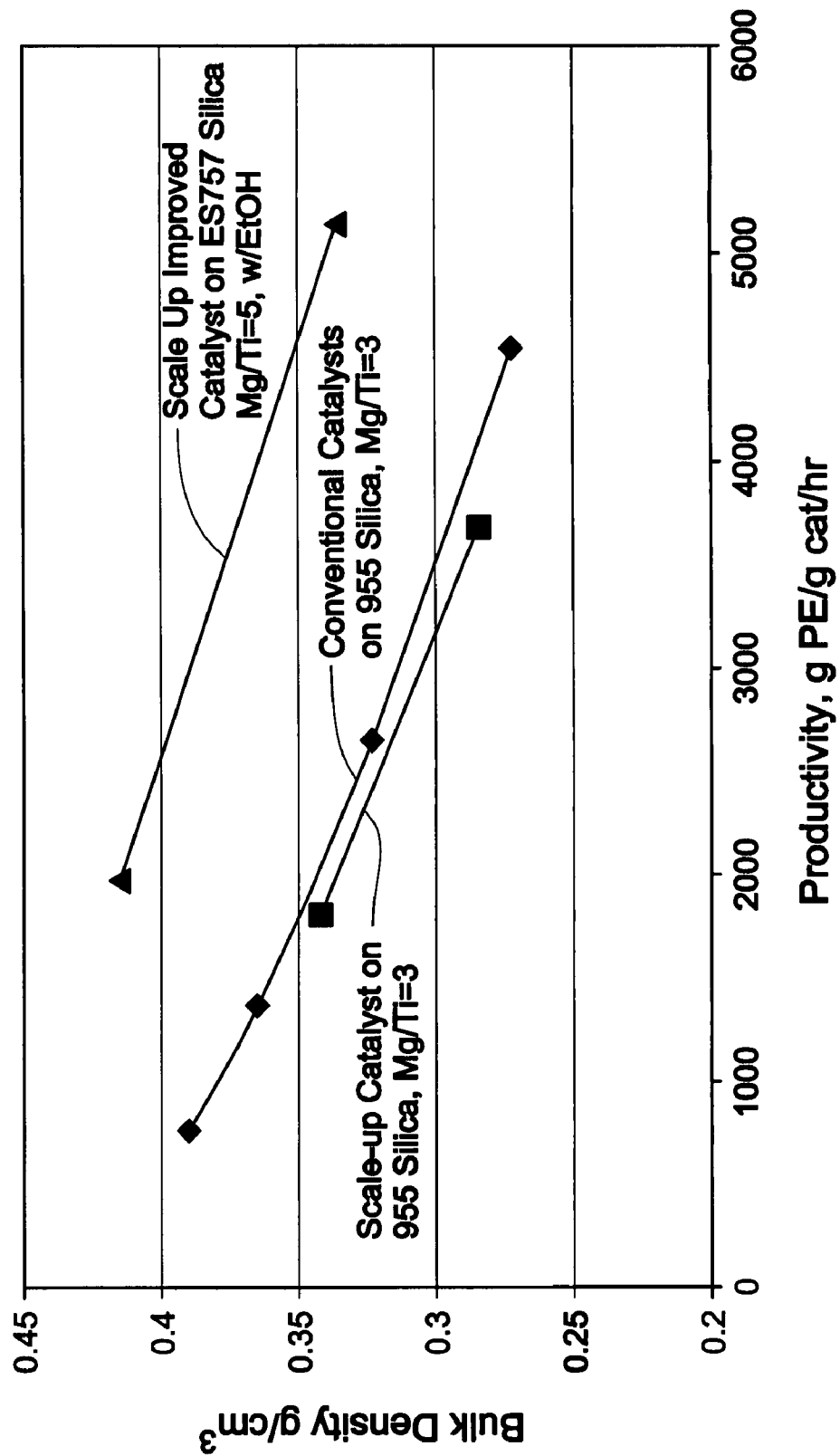
FIG. 5 is a graphical illustration of the relationship between catalyst system productivity and polymer product bulk density for certain exemplary catalyst systems.

The relationship between productivity and bulk density of the experimental scaled-up catalysts is illustrated in FIG. 5.

Example 2 demonstrates, inter alia, that the improved experimental catalysts prepared using supports that use ES757 silica having a smaller particle size, a narrower particle size distribution, and a larger average pore diameter of at least ≧220 angstroms appear to demonstrate a desirable productivity-vs.-bulk-density relationship, which may correlate across a variety of magnesium-to-titanium ratios.

EXAMPLE 3

Sample catalyst compositions prepared in the manner described above were reacted in a polymerization process in a pilot plant reactor.

Polymerization was conducted in a 24 inch diameter gas-phase fluidized bed reactor operating at approximately 300 psig total pressure. The reactor bed weight was approximately 500-600 pounds. Fluidizing gas was passed through the bed at a velocity of approximately 2.0 feet per second. The fluidizing gas exiting the bed entered a resin-disengaging zone located at the upper portion of the reactor. The fluidizing gas then entered a recycle loop and passed through a water-cooled heat exchanger and cycle gas compressor. The shell side water temperature was adjusted to maintain the reaction temperature to the specified value. Ethylene, hydrogen, 1-hexene and nitrogen were fed to the cycle gas loop just upstream of the compressor at quantities sufficient to maintain the desired gas concentrations. Triethylaluminum cocatalyst was fed to the reactor in quantities sufficient to support reaction. Gas concentrations were measured by an on-line vapor fraction analyzer. The catalyst was fed to the reactor bed through a stainless steel injection tube at a rate sufficient to maintain the desired polymer production rate. Nitrogen gas was used to disperse the catalyst into the reactor. Product was withdrawn from the reactor in batch mode into a purging vessel before it was transferred into a product drum. Residual catalyst and cocatalyst in the resin were deactivated in the product drum with a wet nitrogen purge.

The properties of the sample catalyst compositions, and the results of the polymerization reactions are set forth in the tables below.

TABLE 13

| Sample | Catalyst | Residence Time (hours) | Partial Ethylene Pressure (psi) | Productivity (lbs PE)/ (lbs Catalyst) | Productivity (Ti ICP-based) | $H_2/C_2$ (mol/mol) | $C_6/C_2$ (mol/mol) |
|---|---|---|---|---|---|---|---|
| 23 | Control Catalyst B [Davison 955 silica, Mg/Ti = 3] | 3.7 | 110 | 5,257 | 3,709 | 0.155 | 0.142 |
| 24 | ScaleUp Catalyst C [Davison 955 silica, Mg/Ti = 3] | 4.8 | 110 | 6,160 | 6,552 | 0.142 | 0.113 |
| 25 | ScaleUp Catalyst C [Davison 955 silica, Mg/Ti = 5, with ethanol] | 4.0 | 79 | 6,114 | 4,383 | 0.147 | 0.137 |
| 26 | ScaleUp Catalyst E [Davison 955 silica, Mg/Ti = 5, with ethanol] | 3.6 | 110 | 9,421 | 7,149 | 0.123 | 0.110 |
| 27 | ScaleUp Catalyst D1 [Ineos ES-757 silica, Mg/Ti = 5, with ethanol] | 4.7 | 110 | 4,758 | 4,545 | 0.185 | 0.134 |
| 28 | ScaleUp Catalyst D1 [Ineos ES-757 silica, Mg/Ti = 5, with ethanol] | 4.3 | 79 | 3,195 | 3,344 | 0.190 | 0.159 |
| 29 | ScaleUp Catalyst C1 [Ineos ES-757 silica, Mg/Ti = 5, with ethanol] | 5.0 | 110 | 7,066 | Not Determined | 0.166 | Not Determined |
| 30 | ScaleUp Catalyst C1 [Ineos ES-757 silica, Mg/Ti = 5, with ethanol] | 5.5 | 79 | 5,085 | 4,985 | 0.138 | 0.149 |
| 31 | ScaleUp Catalyst E1 [Ineos ES-757 silica, Mg/Ti = 5, with ethanol] | 3.7 | 110 | 9,005 | 4,202 | 0.146 | 0.126 |
| 32 | ScaleUp Catalyst E1 [Ineos ES-757 silica, Mg/Ti = 5, with ethanol] | 5.0 | 79 | 4,780 | 8,419 | 0.136 | 0.146 |

TABLE 14

| Sample | Catalyst | C6/C2 (mol/mol) | Melt Index $I_2$ (g)/[(dg)(min)] | MFR ($I_{21}/I_{12}$) | Density (grams/cm$^3$) | Settled Bulk Density (lbs/ft$^3$) |
|---|---|---|---|---|---|---|
| 23 | Control Catalyst B [Davison 955 silica, Mg/Ti = 3] | 0.142 | 0.945 | 32.54 | 0.9187 | 20.9 |
| 24 | ScaleUp Catalyst C [Davison 955 silica, Mg/Ti = 3] | 0.113 | 0.707 | 31.26 | 0.9228 | 20.3 |
| 25 | ScaleUp Catalyst C [Davison 955 silica, Mg/Ti = 5, with ethanol] | 0.137 | 0.641 | 33.00 | 0.9176 | 20.5 |
| 26 | ScaleUp Catalyst E [Davison 955 silica, Mg/Ti = 5, with ethanol] | 0.110 | 0.627 | 34.04 | 0.9226 | 17.9 |
| 27 | ScaleUp Catalyst D1 [Ineos ES-757 silica, Mg/Ti = 5, with ethanol] | 0.134 | 0.759 | 30.38 | 0.9228 | 24.1 |
| 28 | ScaleUp Catalyst D1 [Ineos ES-757 silica, Mg/Ti = 5, with ethanol] | 0.159 | 0.885 | 29.67 | 0.9178 | 23.7 |
| 29 | ScaleUp Catalyst C1 [Ineos ES-757 silica, Mg/Ti = 5, with ethanol] | Not Determined | 0.748 | 31.55 | 0.9180 | 21.9 |
| 30 | ScaleUp Catalyst C1 [Ineos ES-757 silica, Mg/Ti = 5, with ethanol] | 0.149 | 0.90 | Not Determined | 0.9195 | 22.3 |

TABLE 14-continued

| Sample | Catalyst | C6/C2 (mol/mol) | Melt Index $I_2$ (g)/[(dg)(min)] | MFR ($I_{21}/I_{12}$) | Density (grams/cm$^3$) | Settled Bulk Density (lbs/ft$^3$) |
|---|---|---|---|---|---|---|
| 31 | ScaleUp Catalyst E1 [Ineos ES-757 silica, Mg/Ti = 5, with ethanol] | 0.126 | 0.727 | 31.42 | 0.9212 | 22.6 |
| 32 | ScaleUp Catalyst E1 [Ineos ES-757 silica, Mg/Ti = 5, with ethanol] | 0.146 | 0.714 | 32.27 | 0.9176 | 22.1 |

Figure 6:
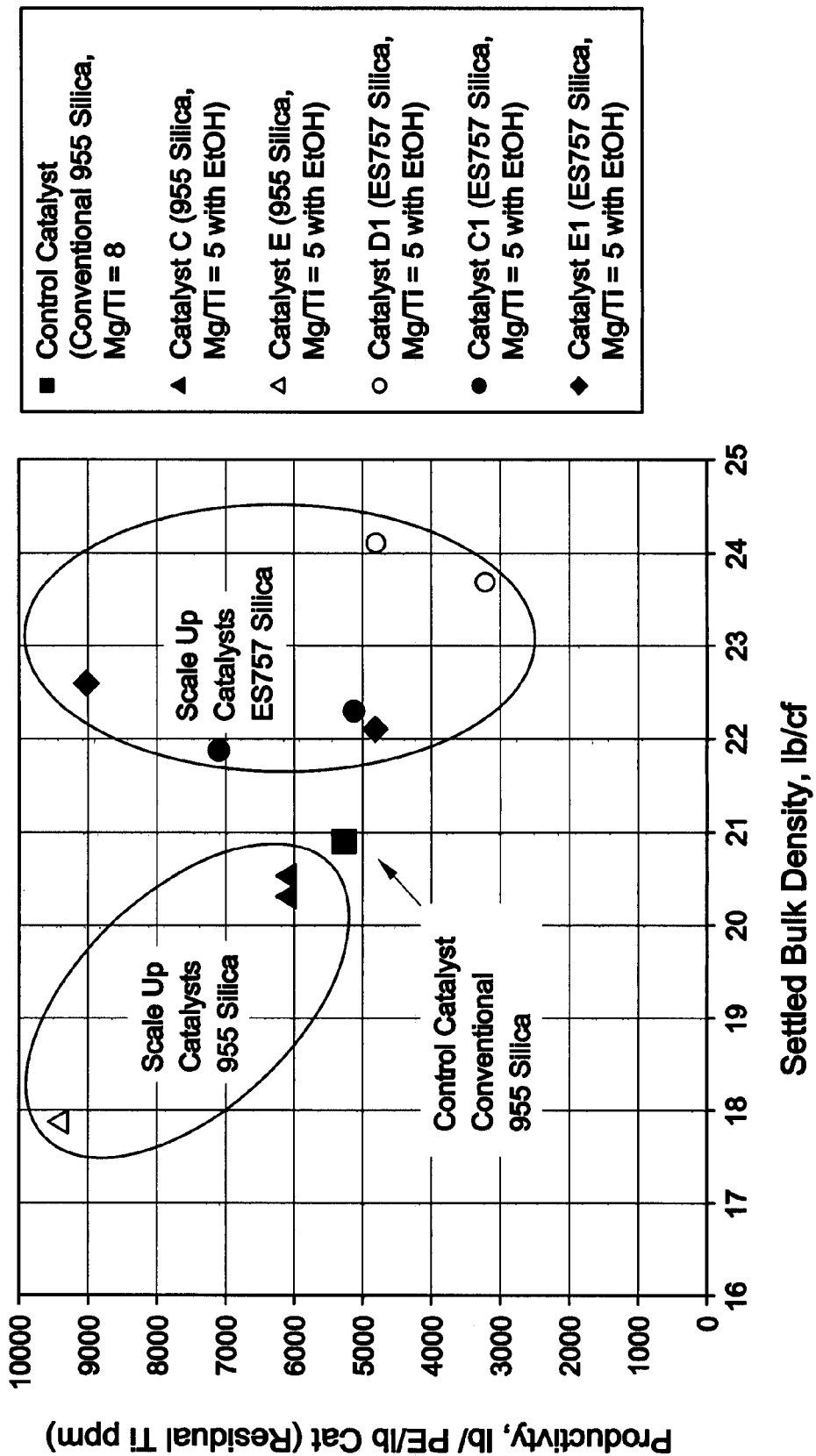
FIG. 6 is a graphical illustration of the relationship between catalyst system productivity and polymer product bulk density for certain exemplary catalyst systems.

The above example demonstrates, inter alia, the inventive catalysts prepared with ES757 silica led to both enhanced productivity and polymer products that demonstrated, for example, improved settled bulk density. The unexpected increase of the resin bulk density with increased productivity is generally opposite to that demonstrated by polymerizations conducted with conventional catalysts, and is highly beneficial for the fluid bed gas phase operation. These findings are further illustrated in FIG. 6.

Therefore, the present invention is well adapted to carry out the objects and attain the ends and advantages mentioned as well as those that are inherent therein. While the invention has been depicted, described, and is defined by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A process for making polyolefins, the process comprising contacting, in a reactor, ethylene and at least one comonomer selected from the group consisting of $C_3$ to $C_8$ alpha olefin in the presence of a supported catalyst system, the supported catalyst system comprising at least one titanium compound, at least one magnesium compound, at least one electron donor compound, at least one activator compound, and at least one silica support material, the at least one silica support material having a median particle size in the range of from 20 to 50 microns and an average pore diameter from 220 Angstroms to 265 Angstroms; wherein the at least one silica support material has no more than 10% of the particles having a size less than 10 microns and no more than 10% of the particles having a size greater than 50 microns.

2. The process of claim 1, wherein the at least one magnesium compound has the formula $MgX_2$, wherein X is selected from the group consisting of Cl, Br, I or mixtures thereof.

3. The process of claim 2, wherein the at least one magnesium compound is selected from the group consisting of: $MgCl_2$, $MgBr_2$ and $MgI_2$.

4. The process of claim 1, wherein the at least one titanium compound has the formula $Ti(OR)_aX_b$, wherein R is selected from the group consisting of: a $C_1$ to $C_{14}$ aliphatic hydrocarbon radical, a $C_1$ to $C_{14}$ aromatic hydrocarbon radical, and COR' where R' is a $C_1$ to $C_{14}$ aliphatic or aromatic hydrocarbon radical; X is selected from the group consisting of Cl, Br, I and mixtures thereof; a is selected from the group consisting of 0, 1 and 2; b is 1 to 4 inclusive; and a+b=3 or 4.

5. The process of claim 1, wherein the at least one titanium compound is selected from the group consisting of: $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

6. The process of claim 1, wherein the at least one silica support material has a median particle size in the range of from 20 to 35 microns.

7. The process of claim 1, wherein the at least one silica support material has a median particle size in the range of from 20 to 30 microns.

8. The process of claim 1, wherein the at least one silica support material has a particle size distribution in which no more than 10% of the particles have a size below 12 microns, and no more than 8% of the particles have a size above 50 microns.

9. The process of claim 1, wherein the at least one silica support material has a surface area of at least 200 square meters per gram.

10. The process of claim 1, wherein the at least one silica support material has an average pore volume of at least 1.4 ml/gram.

11. The process of claim 1, wherein the at least one silica support material has an average pore diameter of 225 Angstroms.

12. The process of claim 1, wherein the at least one silica support material has an average pore diameter of 230 Angstroms.

13. The process of claim 1, wherein the at least one silica support material has an average pore diameter of 235 Angstroms.

* * * * *